US 9,459,819 B2

(12) United States Patent
Belbin

(10) Patent No.: US 9,459,819 B2
(45) Date of Patent: Oct. 4, 2016

(54) METHOD, APPARATUS AND SYSTEM FOR ASSOCIATING AN INTERMEDIATE FILL WITH A PLURALITY OF OBJECTS

(75) Inventor: Joseph Leigh Belbin, Summer Hill (AU)

(73) Assignee: CANON KABUSHIKI KAISHA, Tokyo (JP)

(*) Notice: Subject to any disclaimer, the term of this patent is extended or adjusted under 35 U.S.C. 154(b) by 313 days.

(21) Appl. No.: 13/286,557

(22) Filed: Nov. 1, 2011

(65) Prior Publication Data
US 2012/0105911 A1 May 3, 2012

(30) Foreign Application Priority Data
Nov. 3, 2010 (AU) .............................. 2010-241218

(51) Int. Cl.
| G06K 15/02 | (2006.01) |
| G06F 3/12 | (2006.01) |
| G06T 15/50 | (2011.01) |
| G06T 11/40 | (2006.01) |

(52) U.S. Cl.
CPC .............. *G06F 3/122* (2013.01); *G06F 3/1247* (2013.01); *G06F 3/1285* (2013.01); *G06T 11/40* (2013.01); *G06F 2206/1514* (2013.01)

(58) Field of Classification Search
CPC ........... G06F 2206/1514; G06F 3/122; G06F 3/1247; G06F 3/1285; G06T 11/40
USPC ...................................................... 345/629
See application file for complete search history.

(56) References Cited

U.S. PATENT DOCUMENTS

| 5,398,309 | A | * | 3/1995 | Atkins et al. ................. 345/634 |
| 5,504,842 | A | * | 4/1996 | Gentile ........................ 358/1.15 |
| 5,668,931 | A | * | 9/1997 | Dermer ......................... 358/1.4 |
| 5,933,588 | A | * | 8/1999 | Easwar et al. ............... 358/1.17 |
| 6,049,390 | A | * | 4/2000 | Notredame et al. ......... 358/1.15 |
| 6,594,030 | B1 | * | 7/2003 | Ahlstrom et al. ........... 358/1.15 |
| 7,023,439 | B2 | * | 4/2006 | Martin et al. ................ 345/428 |
| 7,317,543 | B2 | | 1/2008 | Gnutzmann |
| 7,333,115 | B2 | * | 2/2008 | Yamaguchi ................... 345/505 |
| 7,561,303 | B2 | * | 7/2009 | Groarke et al. ............... 358/1.9 |
| 7,839,533 | B2 | * | 11/2010 | Nishide et al. .............. 358/1.18 |
| 8,203,747 | B2 | * | 6/2012 | Owen ............................ 358/1.8 |
| 8,218,200 | B2 | * | 7/2012 | Yang et al. .................... 358/1.9 |
| 2002/0027563 | A1 | * | 3/2002 | Van Doan et al. ........... 345/630 |
| 2005/0206653 | A1 | * | 9/2005 | Beaumont ..................... 345/629 |

(Continued)

FOREIGN PATENT DOCUMENTS

| AU | 2005203541 A1 | 3/2007 |
| AU | 2009202377 A1 | 1/2011 |

(Continued)

*Primary Examiner* — Sing-Wai Wu
(74) *Attorney, Agent, or Firm* — Canon USA, Inc. IP Division

(57) ABSTRACT

A method of associating a shared fill with a plurality of objects, is disclosed. Each of the objects is associated with a fill. A bounding region of the shared fill is determined based on a fill of a first of the plurality of objects. The first object is associated with the shared fill. A second object is received and the shared fill is updated based on a fill of the second object if: (a) the fill of the second object is contained within the bounding region; and (b) the fill of the second object is non-overlapping with the fill of the first object. The second object is associated with the updated intermediate fill. The updated shared fill is shared by the first object and the second object.

18 Claims, 21 Drawing Sheets

(56) References Cited

U.S. PATENT DOCUMENTS

| | | | |
|---|---|---|---|
| 2006/0103671 A1* | 5/2006 | Brown | 345/629 |
| 2006/0192983 A1 | 8/2006 | Groarke et al. | |
| 2008/0121939 A1* | 5/2008 | Murray et al. | 257/202 |
| 2008/0152260 A1 | 6/2008 | Cheng et al. | |
| 2009/0237734 A1* | 9/2009 | Owen | 358/1.16 |
| 2009/0303550 A1* | 12/2009 | Hirabayashi | 358/448 |
| 2009/0324065 A1* | 12/2009 | Ishida et al. | 382/164 |
| 2010/0315431 A1* | 12/2010 | Smith et al. | 345/619 |
| 2010/0328716 A1* | 12/2010 | Mori | 358/1.15 |

FOREIGN PATENT DOCUMENTS

| | | |
|---|---|---|
| AU | 2009212933 A1 | 3/2011 |
| JP | 2004318832 A | 11/2004 |
| JP | 2010238235 A | 10/2010 |

* cited by examiner

METHOD, APPARATUS AND SYSTEM FOR ASSOCIATING AN INTERMEDIATE FILL WITH A PLURALITY OF OBJECTS

FIELD OF INVENTION

The present invention relates generally to image processing and, in particular, to a method and apparatus reducing the memory usage of complex display lists. The present invention also relates to a computer program product including a computer readable medium having recorded thereon a computer program for associating an intermediate fill with a plurality of objects.

DESCRIPTION OF BACKGROUND ART

A print job, which may consist of one or more pages and which is to be printed on a printer, is typically sent to the printer in a form utilizing a page description language (PDL), such as PostScript™ or PDF of Adobe™, or PCL of HP™. In a typical page description language printer, the page description input is translated into high-level graphics objects. Each graphics object generally consists of a number of graphics primitives each typically comprising path data which indicates where the object is active on the page, fill data which indicates the colour of the object, and compositing data which indicates how the object will interact with any objects below. The graphics primitives are stored in an intermediate format known as a display list. A completed display list is then sent to a renderer for rendering to a page of pixel data destined for a printer engine.

Common types of fills are flat colours, bitmaps, and linear and radial shadings. A bitmap fill generally consists of source bitmap data, which is specified in a source coordinate system, and an affine transformation, which maps between the source coordinate system and the output page coordinate system.

A job may potentially contain a very large number of graphics objects, each referencing a path and an individual bitmap fill. In this case, the memory required to store the display list could be a significant fraction of the total job memory. Since memory represents a substantial cost, it is desirable to reduce the memory used by the display list without significantly decreasing the rendered page quality.

One known method for reducing the display list memory is to convert the display list into an intermediate format known as a fillmap. A fillmap consists of non-overlapping regions. Each region references a sequence of one or more fills, which are derived from the objects which are active in the given region. Neighbouring regions can be combined if the regions reference the same sequence of fills. In general, the memory required to store the intermediate format is related to the number of regions. However, if there are a large number of display list objects with a large number of individual fills, it is likely that there will be a large number of regions in the intermediate format. By converting the display list to a fillmap intermediate format, the memory required to store the path data for each object can be freed. However, the memory required to store the fill data may remain high.

A method of reducing the memory required for bitmap fills associated with a number of images is to combine the fills by rendering the fills into a consolidated image. Rendering the images involves compositing operations to be performed. In order to render objects which are transparent or which are composited with underlying objects, the underlying objects must also be rendered. This means that in the worst case, the entire display list must be rendered, and this processing is expensive both computationally and in memory usage.

Thus, a need exists to reduce the amount of memory used by the intermediate format.

SUMMARY OF THE INVENTION

It is an object of the present invention to substantially overcome, or at least ameliorate, one or more disadvantages of existing arrangements.

According to one aspect of the present disclosure there is provided a method of associating a shared fill with a plurality of objects, each of said objects being associated with a fill, said method comprising:
determining a bounding region of the shared fill based on a fill of a first of the plurality of objects;
associating the first object with the shared fill;
receiving a second object;
updating the shared fill based on a fill of the second object if: (a) the fill of the second object is contained within the bounding region; and (b) the fill of the second object is non-overlapping with the fill of the first object;
associating the second object with the updated shared fill, said updated shared fill being shared by the first object and the second object; and
rendering the first object and the second object using the updated shared fill.

According to another aspect of the present disclosure there is provided a method of associating a shared fill with a plurality of objects, each of said objects being associated with a fill, said method comprising:
associating the first object with the shared fill;
receiving a second object;
updating the shared fill based on a fill of the second object if:
(a) the fill of the second object is within a predetermined distance of the fill of the first object;
(b) the fill of the second object is non-overlapping with the fill of the first object; and
associating the second object with the updated shared fill, said updated shared fill being shared by the first object and the second object; and
rendering the first object and the second object using the updated shared fill.

According to still another aspect of the present disclosure, there is provided a system for associating a shared fill with a plurality of objects, each of said objects being associated with a fill, said system comprising:
a memory for storing data and a computer program;
a processor for executing said computer program, said computer program comprising instructions for:
determining a bounding region of the shared fill based on a fill of a first of the plurality of objects;
associating the first object with the shared fill;
receiving a second object;
updating the shared fill based on a fill of the second object if: (a) the fill of the second object is contained within the bounding region; and (b) the fill of the second object is non-overlapping with the fill of the first object;
associating the second object with the updated shared fill, said updated shared fill being shared by the first object and the second object, and
a printer receiving the updated shared fill to render the first and the second objects using the updated shared fill.

According to still another aspect of the present disclosure there is provided a system for associating a shared fill with a plurality of objects, each of said objects being associated with a fill, said system comprising:

a memory for storing data and a computer program;

a processor for executing said computer program, said computer program comprising instructions for:

associating the first object with the shared fill;

receiving a second object;

updating the shared fill based on a fill of the second object if:

(a) the fill of the second object is within a predetermined distance of the fill of the first object; and (b) the fill of the second object is non-overlapping with the fill of the first object; and associating the second object with the updated shared fill, said updated shared fill being shared by the first object and the second object, and a printer receiving the updated shared fill to render the first and the second objects using the updated shared fill.

According to still another aspect of the present disclosure there is provided an apparatus for associating an intermediate fill with a plurality of objects, each of said objects being associated with a fill, said apparatus comprising:

means for determining a bounding region of the intermediate fill based on a fill of a first of the plurality of objects;

means for associating the first object with the intermediate fill;

means for receiving a second object;

means for updating the intermediate fill based on a fill of the second object if: (a) the fill of the second object is contained within the bounding region; and (b) the fill of the second object is non-overlapping with the fill of the first object; and means for associating the second object with the updated intermediate fill.

According to still another aspect of the present disclosure there is provided an apparatus for associating a shared fill with a plurality of objects, each of said objects being associated with a fill, said apparatus comprising:

means for associating the first object with the shared fill;

means for receiving a second object;

means for updating the shared fill based on a fill of the second object if:

(a) the fill of the second object is within a predetermined distance of the fill of the first object; and (b) the fill of the second object is non-overlapping with the fill of the first object;

means for associating the second object with the updated shared fill, said updated shared fill being shared by the first object and the second object; and means for rendering the first object and the second object using the updated shared fill.

According to still another aspect of the present disclosure there is provided a computer readable medium having recorded therein a computer program for associating a shared fill with a plurality of objects, each of said objects being associated with a fill, said computer program comprising computer code means for:

determining a bounding region of the shared fill based on a fill of a first of the plurality of objects;

associating the first object with the shared fill;

receiving a second object;

updating the shared fill based on a fill of the second object if: (a) the fill of the second object is contained within the bounding region; and (b) the fill of the second object is non-overlapping with the fill of the first object;

associating the second object with the updated shared fill, said updated shared fill being shared by the first object and the second object; and rendering the first object and the second object using the updated shared fill.

According to still another aspect of the present disclosure there is provided a computer readable medium having recorded therein a computer program for associating a shared fill with a plurality of objects, each of said objects being associated with a fill, said computer program comprising computer code means for:

associating the first object with the shared fill;

receiving a second object;

updating the shared fill based on a fill of the second object if:

(a) the fill of the second object is within a predetermined distance of the fill of the first object;

(b) the fill of the second object is non-overlapping with the fill of the first object; and associating the second object with the updated shared fill, said updated shared fill being shared by the first object and the second object; and rendering the first object and the second object using the updated shared fill.

According to still another aspect of the present disclosure there is provided a method of creating shared fill information for a plurality of objects in a display list, said method comprising:

receiving a first object having first fill information;

receiving a second object, said second object having second fill information, wherein said second fill information is non-overlapping with the first fill information;

updating said first fill information based on the second fill information in the event that the first fill information is non-overlapping with the second fill information;

associating the second object with the updated fill information to create shared fill information for the first object and the second object; and rendering the first and the second object using the updated shared fill information.

Other aspects of the invention are also disclosed.

BRIEF DESCRIPTION OF THE DRAWINGS

One or more embodiments of the invention will now be described with reference to the following drawings, in which.

DETAILED DESCRIPTION OF EMBODIMENTS OF THE INVENTION

Figure 1A:
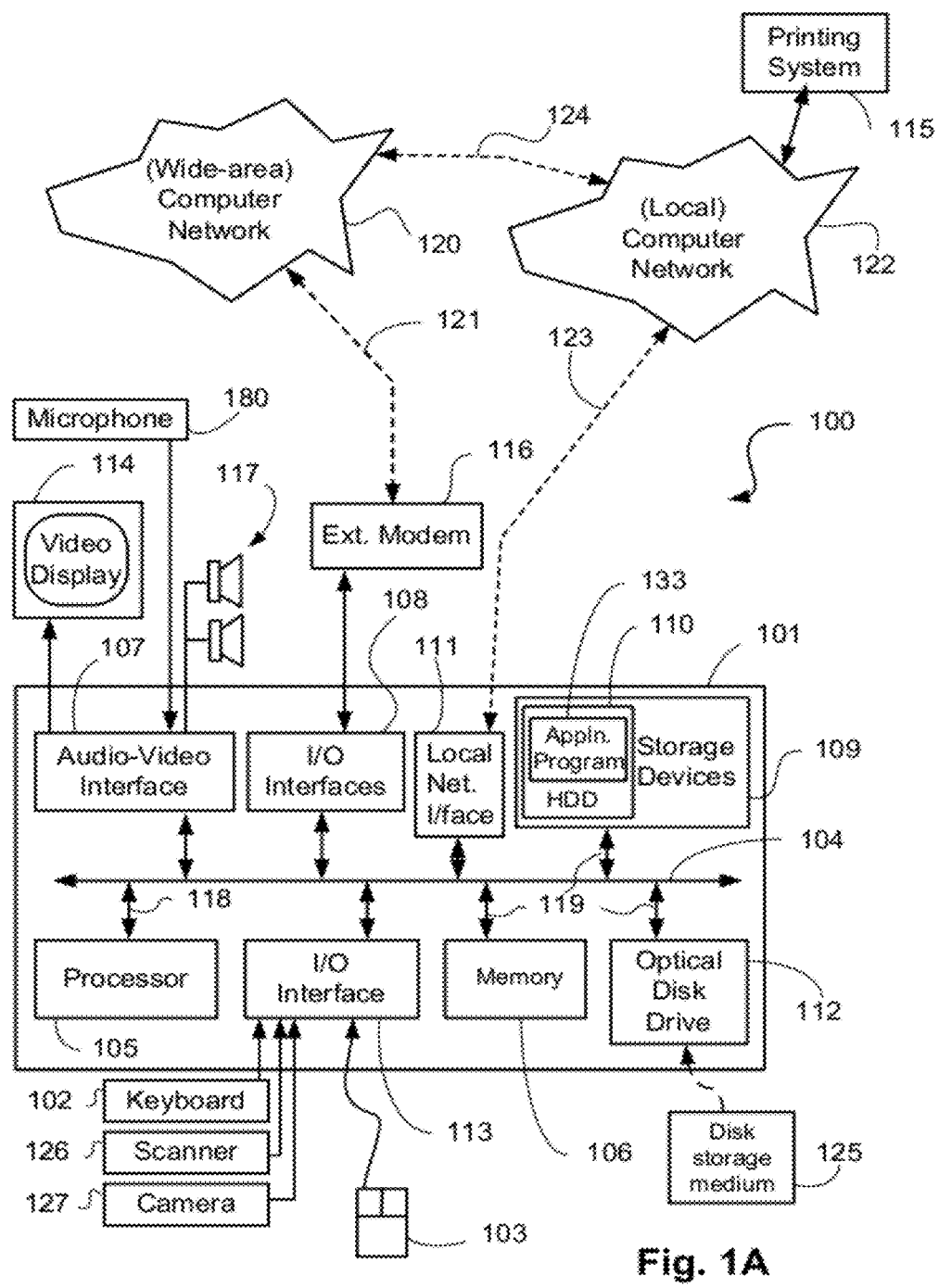
FIGS. 1a to 1c collectively form a schematic block diagram of a pixel rendering system, upon which arrangements described may be practiced.

Where reference is made in any one or more of the accompanying drawings to steps and/or features, which have the same reference numerals, those steps and/or features have for the purposes of this description the same function(s) or operation(s), unless the contrary intention appears.

Figure 1B:
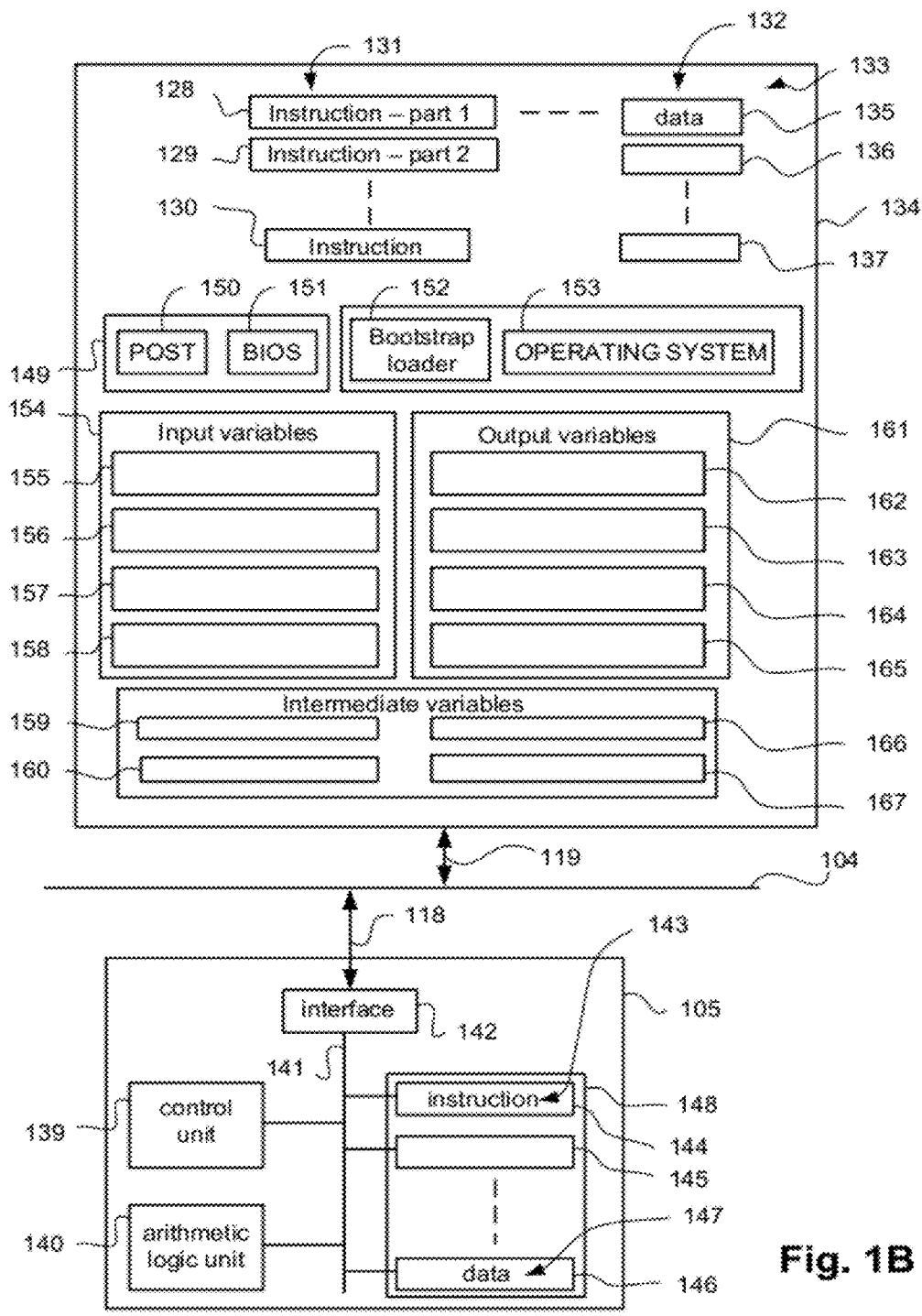
Figure 1C:
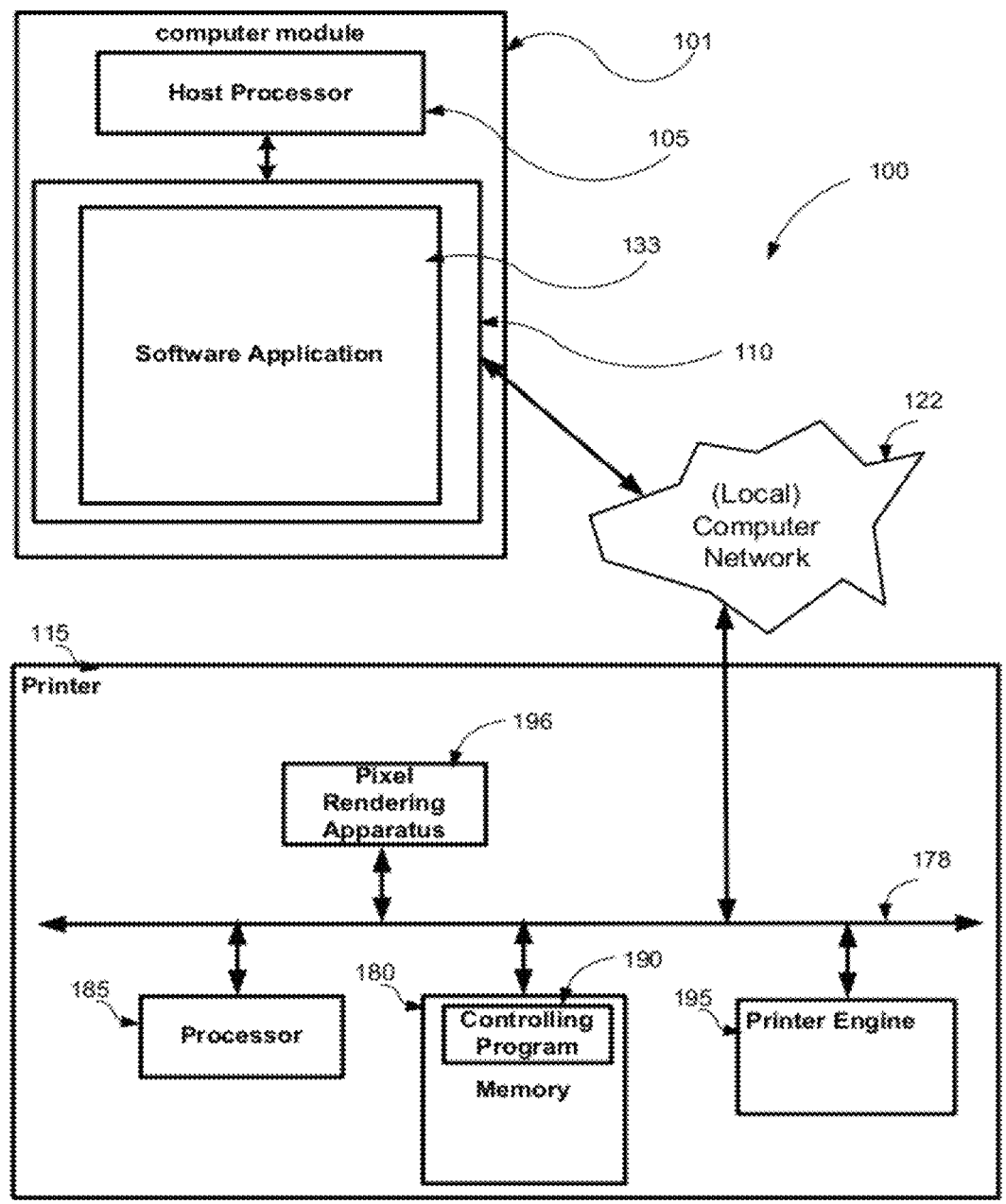

FIGS. 1A to 1C collectively form a schematic block diagram of a pixel rendering system 100, upon which the various arrangements described can be practiced.

As seen in FIG. 1A, the system 100 is formed by a computer module 101, input devices such as a keyboard 102, a mouse pointer device 103, a scanner 126, a camera 127, and a microphone 180, and output devices including a printer 115, a display device 114 and loudspeakers 117. An external Modulator-Demodulator (Modem) transceiver device 116 may be used by the computer module 101 for communicating to and from a communications network 120 via a connection 121. The network 120 may be a wide-area network (WAN), such as the Internet or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the network 120.

The computer module 101 typically includes at least one processor unit 105, and a memory unit 106 for example formed from semiconductor random access memory (RAM) and semiconductor read only memory (ROM). The module 101 also includes a number of input/output (I/O) interfaces including an audio-video interface 107 that couples to the video display 114, loudspeakers 117 and microphone 199, an I/O interface 113 for the keyboard 102, mouse 103, scanner 126, camera 127 and optionally a joystick (not illustrated), and an interface 108 for the external modem 116. In some implementations, the modem 116 may be incorporated within the computer module 101, for example within the interface 108. The computer module 101 also has a local network interface 111 which, via a connection 123, permits coupling of the pixel rendering system 100 to a local computer network 122, known as a Local Area Network (LAN). As also illustrated, the local network 122 may also couple to the wide network 120 via a connection 124, which would typically include a so-called "firewall" device or device of similar functionality. The interface 111 may be formed by an Ethernet™ circuit card, a Bluetooth™ wireless arrangement or an IEEE 802.11 wireless arrangement.

The interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD), USB-RAM, and floppy disks for example may then be used as appropriate sources of data to the system 100.

The components 105 to 113 of the computer module 101 typically communicate via an interconnected bus 104. Examples of computers on which the described arrangements can be practiced include IBM-PC's and compatibles, Sun Sparcstations, Apple Mac™ or alike computer systems evolved therefrom.

Methods described below may be implemented using the system 100 wherein the processes of FIGS. 2 to 16B, to be described, may be implemented as one or more software application programs 133 and/or the controlling program 190 (see FIG. 1C) executable within the system 100. In particular, the steps of the described methods are effected by instructions 131 in the software that are carried out within the system 100. The software instructions 131 may be formed as one or more software code modules, each for performing one or more particular tasks. The software may also be divided into two separate parts, in which a first part and the corresponding software code modules performs the described methods and a second part and the corresponding software code modules manages user interface between the first part and the user.

The software may be stored in a computer readable medium, including the storage devices described below, for example. The software is loaded into the system 100 from the computer readable medium, and then executed by the system 100. A computer readable medium having such software or computer program recorded on it is a computer program product. The use of the computer program product in the system 100 preferably effects an advantageous apparatus for implementing the described methods.

The software 133 is typically stored in the HDD 110 or the memory 106. The software 133 is loaded into the system 100 from a computer readable medium, and then executed by the system 100. Thus for example the software may be stored on an optically readable CD-ROM medium 125 that is read by the optical disk drive 112. A computer readable medium having such software or computer program recorded on it is a computer program product. The use of the computer program product in the computer system 100 preferably effects an advantageous apparatus for implementing the described methods.

In some instances, the application programs 133 may be supplied to the user encoded on one or more CD-ROM 125 and read via the corresponding drive 112, or alternatively may be read by the user from the networks 120 or 122. Still further, the software can also be loaded into the system 100 from other computer readable media. Computer readable storage media refers to any storage medium that participates in providing instructions and/or data to the system 100 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 101. Examples of computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106. A hardware device such as the ROM 149 is sometimes referred to as firmware. The POST program 150 examines hardware within the computer module 101 to ensure proper functioning, and typically checks the processor 105, the memory (109, 106), and a basic input-output systems software (BIOS) module 151, also typically stored in the ROM 149, for correct operation. Once the POST program 150 has run successfully, the BIOS 151 activates the hard disk drive 110. Activation of the hard disk drive 110 causes a bootstrap loader program 152 that is resident on the hard disk drive 110 to execute via the processor 105. This loads an operating system 153 into the RAM memory 106 upon which the operating system 153 commences operation. The operating system 153 is a system level application, executable by the processor 105, to fulfil various high level functions, including processor management, memory management, device management, storage management, software application interface, and generic user interface.

The operating system 153 manages the memory (109, 106) in order to ensure that each process or application running on the computer module 101 has sufficient memory in which to execute without colliding with memory allocated to another process. Furthermore, the different types of memory available in the system 100 must be used properly so that each process can run effectively. Accordingly, the aggregated memory 134 is not intended to illustrate how particular segments of memory are allocated (unless otherwise stated), but rather to provide a general view of the memory accessible by the system 100 and how such is used.

The processor 105 includes a number of functional modules including a control unit 139, an arithmetic logic unit (ALU) 140, and a local or internal memory 148, sometimes called a cache memory. The cache memory 148 typically includes a number of storage registers 144 - 146 in a register section which may store instruction 143 and data 147. One or more internal busses 141 functionally interconnect these functional modules. The processor 105 typically also has one or more interfaces 142 for communicating with external devices via the system bus 104, using a connection 118, or with the application program 133 via a connection 119.

The application program 133 includes a sequence of instructions 131 that may include conditional branch and loop instructions. The program 133 may also include data 132 which is used in execution of the program 133. The instructions 131 and the data 132 are stored in memory locations 128-, 129, and 130 and 135-, 136, and 137 respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128-129.

In general, the processor 105 is given a set of instructions which are executed therein. The processor 105 then waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112. The execution of a set of the instructions may in some cases result in output of data. Execution may also involve storing data or variables to the memory 134.

The described methods use input variables 154 that are stored in the memory 134 in corresponding memory locations 155-158. The described methods produce output variables 161 that are stored in the memory 134 in corresponding memory locations 162-165. Intermediate variables may be stored in memory locations 159, 160, 166 and 167.

The register section 144-146, the arithmetic logic unit (ALU) 140, and the control unit 139 of the processor 105 work together to perform sequences of micro-operations needed to perform "fetch, decode, and execute" cycles for every instruction in the instruction set making up the program 133. Each fetch, decode, and execute cycle comprises:

(a) a fetch operation, which fetches or reads an instruction 131 from a memory location 128;

(b) a decode operation in which the control unit 139 determines which instruction has been fetched; and (c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Figure 4:
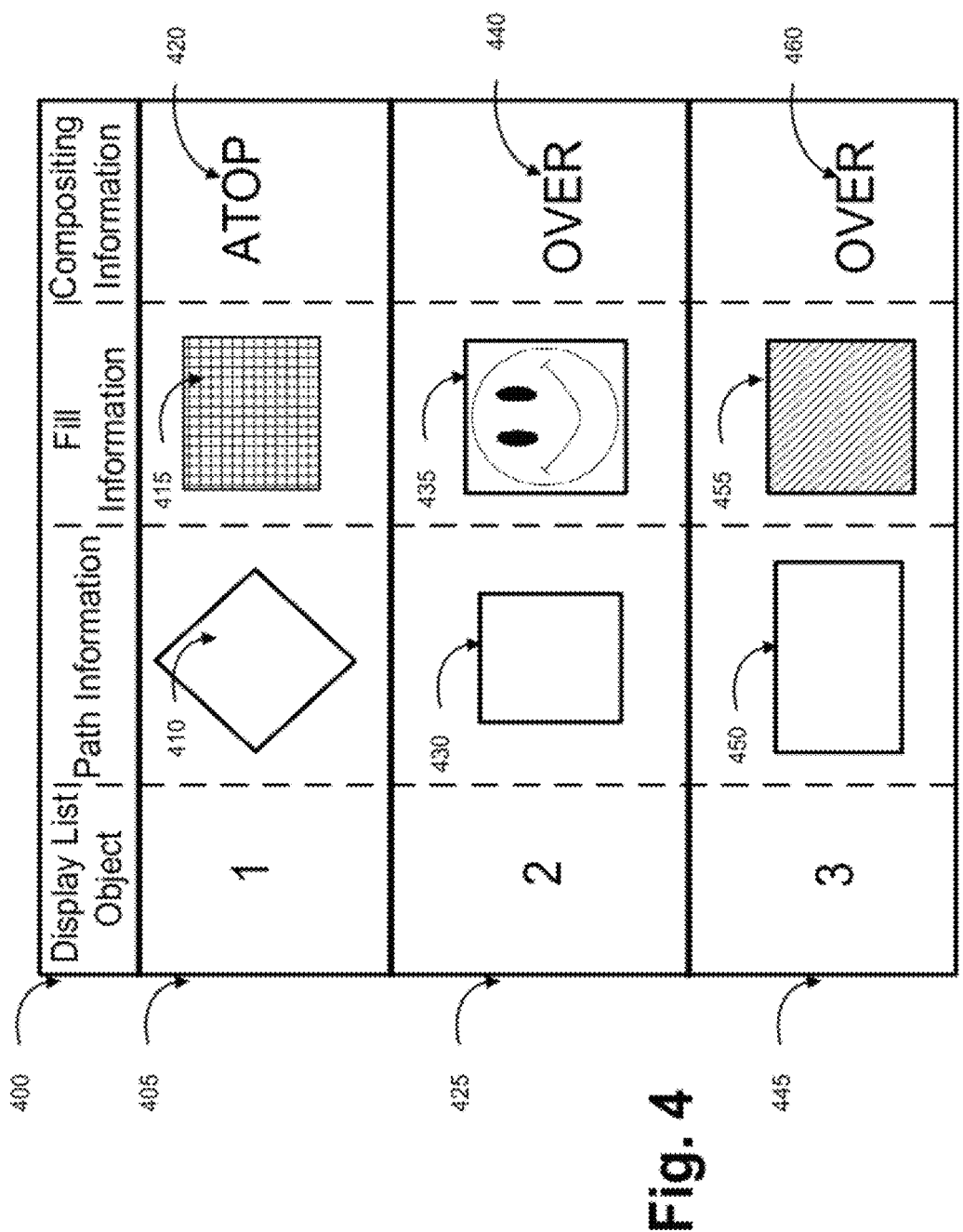
FIG. 4 shows a display list intermediate page representation for the exemplary page of FIG. 3.
Figure 5:
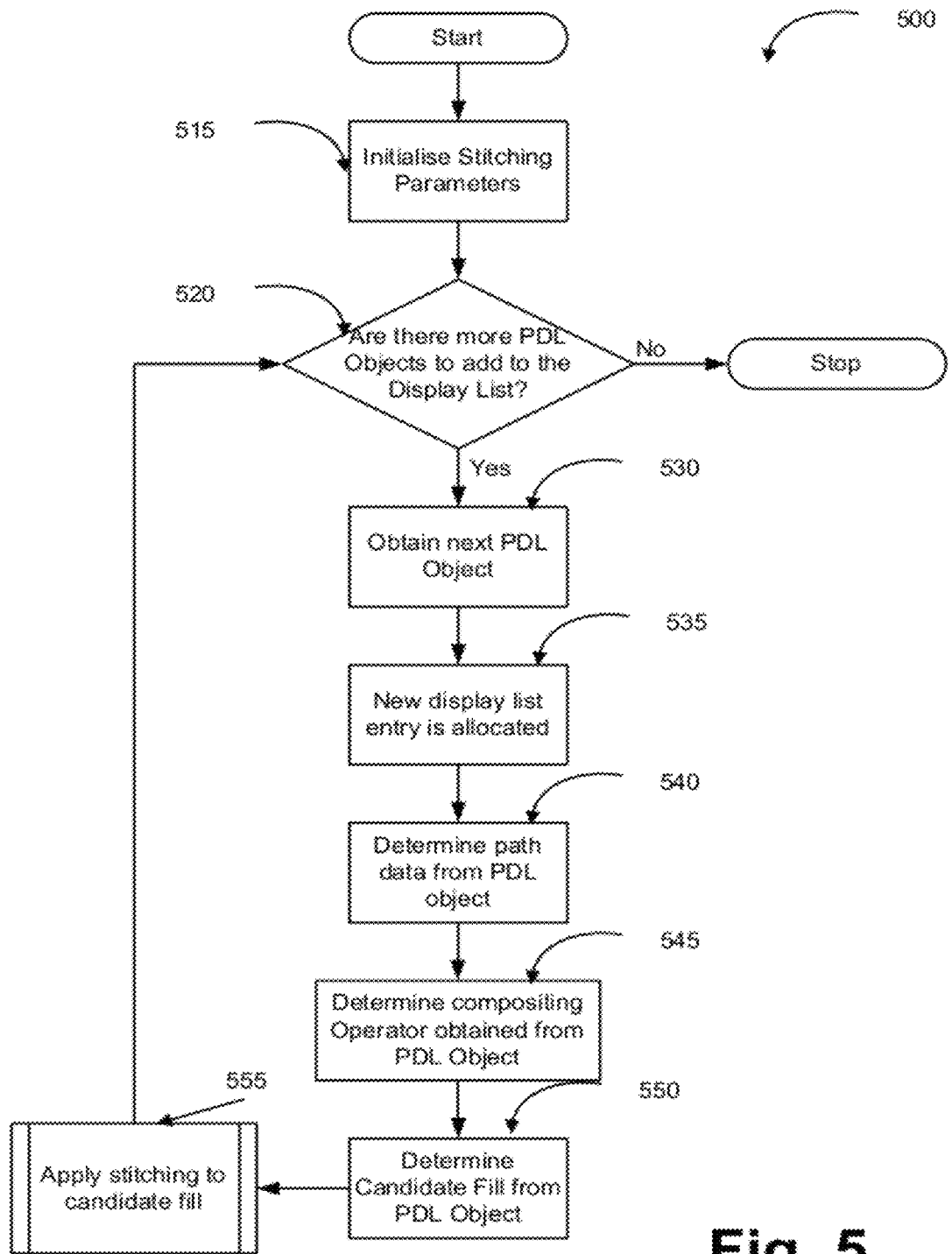
FIG. 5 is a schematic flow diagram showing a method of generating a display list intermediate page representation of a page description language (PDL) page.
Figure 6:
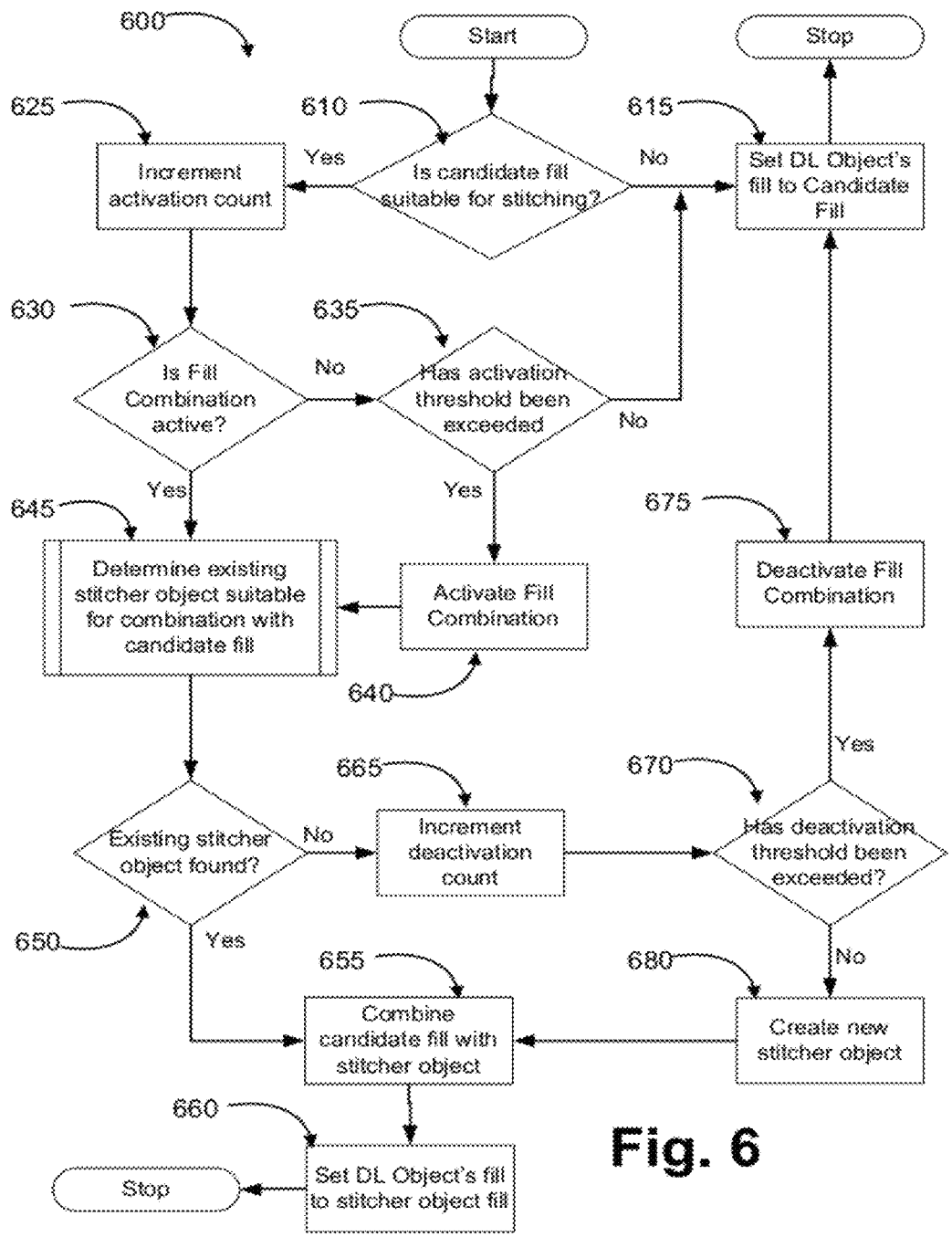
FIG. 6 is a schematic flow diagram showing a method of applying stitching to the candidate fill, as executed in the method of FIG. 5.

Each step or sub-process in the processes of FIGS. 4 to 6 is associated with one or more segments of the program 133, and is performed by the register section 144-147, the ALU 140, and the control unit 139 in the processor 105 working together to perform the fetch, decode, and execute cycles for every instruction in the instruction set for the noted segments of the program 133.

The described methods may alternatively be implemented in dedicated hardware such as one or more integrated circuits performing the functions or sub functions of the methods. Such dedicated hardware may include graphic processors, digital signal processors, or one or more microprocessors and associated memories.

FIG. 1C shows the computer module 101 connected to the printer 115 via the network 122.

The printer 115 comprises a controller processor 185 for executing a controlling program 190 resident in memory 180 in a similar manner to the software application 133. The printer 115 also comprises a pixel rendering apparatus 196 and a printer engine 195. The components 180, 185, 195 and 196 are coupled via a communications bus 178.

The pixel rendering apparatus 196 may be in the form of an ASIC coupled via the bus 178 to the processor 185 and the printer engine 195. However, the pixel rendering apparatus 196 may also be implemented in software executed by the processor 185. In the pixel rendering system 100, the software application 133, under execution of the processor 105, creates page-based documents where each page contains objects such as text, lines, fill regions, and image data. The software application 133 sends a high level description of the page (e.g., as a page description language (PDL) file) to the controlling program 190 being executed by the controller processor 185 of the printer 115, via the network 122.

The controlling program 190 receives the description of the page from the software application 133 and may store the description in memory 180. Objects in the page description are placed into a first intermediate format page representation called a display list, described in further detail below, configured within the memory 180. Each object in the display list references fill data, path data and compositing instructions. The controlling program 190 processes the page description objects to determine if any fills may be combined into an intermediate fill. The controlling program 190 creates any required intermediate fills, or shared fills to be shared by at least two objects.

The display list is used by the controlling program 190 to generate a second intermediate format page representation comprising a fillmap and a table of fill compositing sequences, described in more detail below. Again, the second intermediate format page representation comprising the fillmap and the table of fill compositing sequences is stored in the memory 180.

The controlling program 190 then processes the table of fill compositing sequences to generate a table of fill compositing sequences and stores the table of fill compositing sequences in the memory 180 which require only simple rendering operations. The program 190 executing on the controller processor 185 is also responsible for providing memory 180 for the pixel rendering apparatus 196, initializing the pixel rendering apparatus 196, and instructing the pixel rendering apparatus 196 to start rendering the page.

The pixel rendering apparatus 196 then uses the fillmap and table of fill compositing sequences to render the page to pixels. The output of the pixel rendering apparatus 196 is pixel data. The pixel data may be used by the printer engine 195 to print the page.

Figure 2:
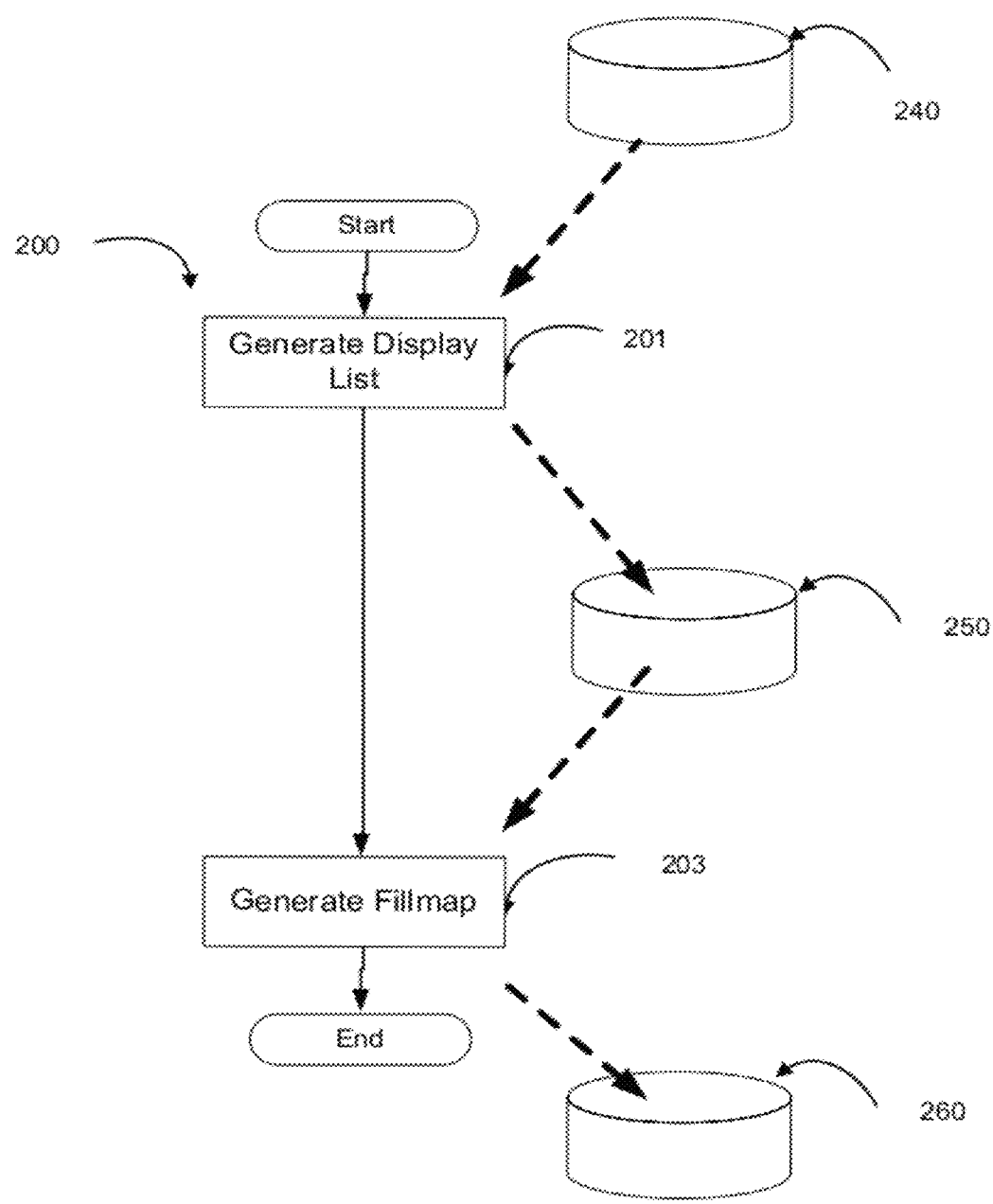
FIG. 2 is a schematic flow diagram showing a method of generating an intermediate page representation.

FIG. 2 is a schematic flow block diagram showing a method 200 of generating an intermediate page representation. The method 200 may be implemented as one or more code modules of the controlling program 190 resident in the memory 180 and being controlled in its execution by the processor 185. The method 200 generates a fillmap and table of fill compositing sequences from the page description provided by the software application 133.

The method 200 begins at step 201 where the controlling program 190, under execution of the processor 185, generates a display list. As represented in FIG. 2, the controlling program 190 receives a page description 240 and generates a first intermediate format page representation 250 in the form of a display list. The display list intermediate page representation 250 may be stored in the memory 180. A method 500 of generating a display list intermediate page representation, as executed at step 201, will be described in detail below with reference to FIG. 5.

The method 200 continues at the next step 203, where the controlling program 190, under execution of the processor 105, processes the display list intermediate page representation 250 and produces a second intermediate format page representation 260 in the form of a fillmap and table of fill compositing sequences. Again, the fillmap and table of fill compositing sequences representation 260 may be stored in the memory 180.

The fillmap and the table of fill compositing sequences representation 260 may be used by the pixel rendering apparatus 196 for rendering to pixels. In order to minimise the memory usage of the second intermediate format page representation 260, fill combination may be performed during the generation of the display list. The objective of fill combination is to replace multiple fills, each having a separate affine transformation mapping from source coordinate system to the page coordinate system, with a single fill having a single affine transformation mapping from source coordinate system to the page coordinate system.

Figure 3:
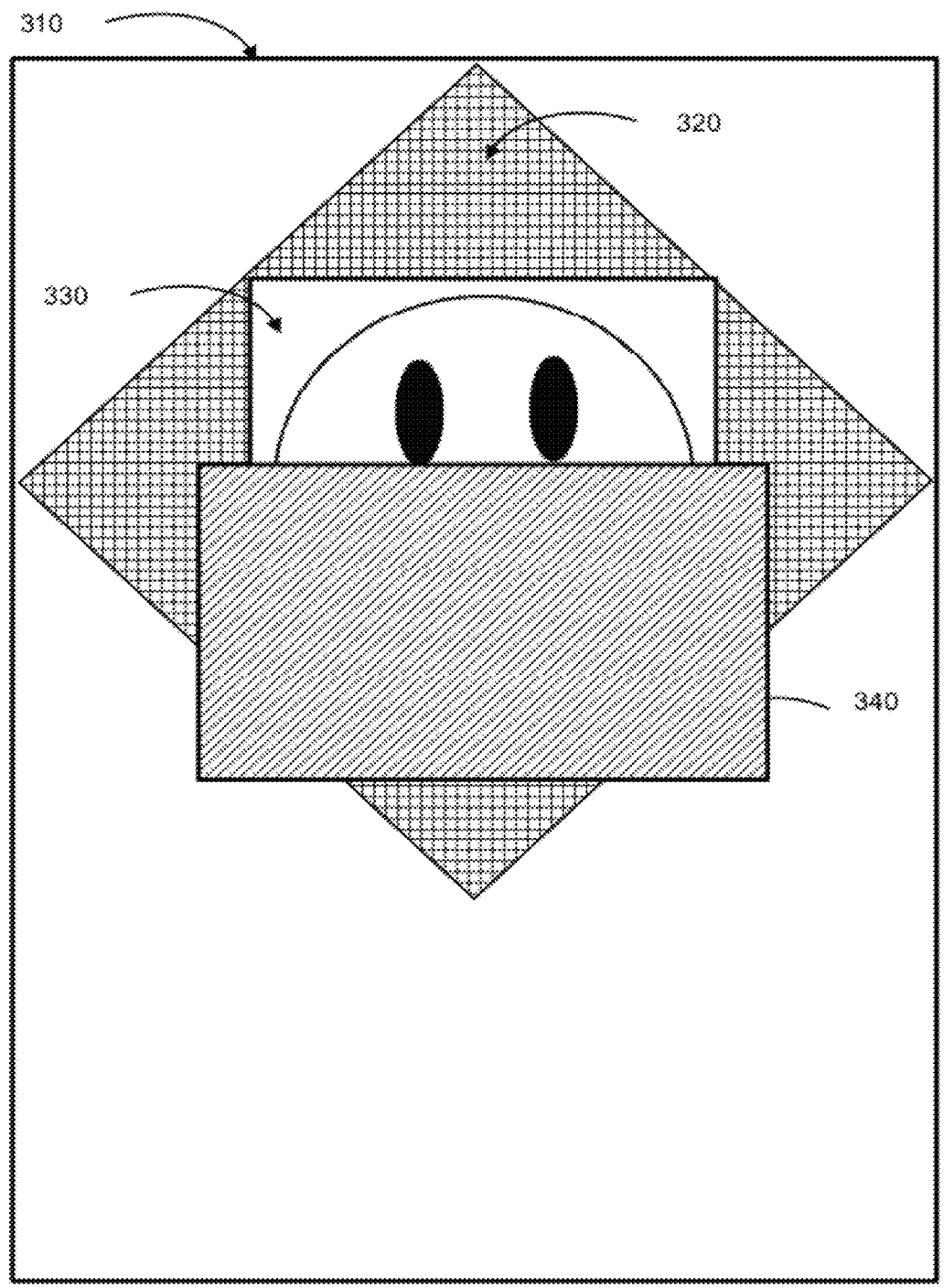
FIG. 3 shows an exemplary page.

FIG. 3 shows an exemplary page 310 comprising a bottom layer object 320 in the form of an opaque diamond, a second from bottom layer object 330 in the form of an opaque bitmap, and a top layer object 340 in the form of semi-transparent flat rectangle 340.

FIG. 4 shows the display list 400 for the example page 310. Each entry (e.g., 405) in the display list 400 references path information, fill information and compositing information. Fill information is data associated with the path information which specifies colour and opacity inside a path. On the other hand, compositing information associated with the path information is an indication of operation used to combine the colour and opacity of an object generated by the path information with the colour and opacity of a background object. As seen in FIG. 4, Display List Object Entry "1" 405 corresponds to the opaque diamond object 320, and references a diamond shape path 410, a linear blend fill 415 and an ATOP compositing operator 420. "Display List Object Entry "2" 425 corresponds to the bitmap object 330, and references a square path 430, a bitmap fill 435 and an OVER compositing operator 440. Display List Object Entry "3" 445 corresponds to the semi-transparent flat rectangle 340 and references a rectangular path 450, a semi-transparent flat colour fill 455 and an OVER compositing operator 460.

The method 500 of generating a display list intermediate page representation, as executed at step 201, will be described in detail below with reference to FIG. 5. The method 500 may be implemented as one or more software code modules of the controlling program 190 resident in the memory 180 and being controlled in its execution by the processor 185. The intermediate page representation is generated from a page description language page (PDL) page comprising one or more objects, such as the page 310. The PDL page may be stored in the memory 180.

The method 500 begins at initialization step 515, where the controlling program 190, under execution of the processor 185, initializes stitching parameters stored within memory 180. The stitching parameters used in the method 500 are a "list of active stitcher objects", a "fill combination active flag", an "activation count" and a "deactivation count".

The activation count counts the number of objects that have been processed and that are suitable for stitching. The activation count is used to determine if the activation threshold has been reached. If the activation threshold is reached, fill combination is activated.

The deactivation count records how many times fill combination failed to combine a suitable fill. The deactivation count is used to determine if the deactivation threshold has been reached. If the deactivation threshold is reached, fill combination is deactivated.

In one implementation, at initializing step 515, the processor 185 sets the fill combination active flag to TRUE, the list of active stitcher objects to none/empty, and the activation count and the deactivation count to zero (0).

At determining step 520, if the controlling program 190 determines that there are remaining objects in the PDL page which need to be processed and added to the display list, then the method 500 proceeds to step 530. Otherwise, if there are no further PDL objects to process, then the method 500 concludes.

At fetching step 530, the PDL object to be processed is obtained from memory 180. The method 500 then proceeds to display list entry step 535, where a new display list entry is allocated and added to a display list configured within the memory 180. Processing then moves to path data step 540, where the controlling program 190 determines path data from the PDL object. The path data is added to the new display list entry of the display list configured within the memory 180.

The method 500 then moves to compositing operator step 545, where the compositing operator is determined from the PDL object by the controlling program 190 and is added to the new display list entry within the display list. The fill information of a PDL object is referred below to as the fill of the PDL object. The method 500 then proceeds to step 550, where the fill of the PDL object is obtained and stored as a temporary fill called a "candidate fill" within the memory 190. Processing then moves to the candidate fill stitching step 555. At stitching step 555, the controlling program 190, under execution of the processor 185, applies stitching to the candidate fill and sets the fill property of the new display list entry corresponding to the PDL object currently being processed. A method 600 of applying stitching to the candidate fill, as executed at step 555, will now be described with reference to FIG. 6.

The method 600 may be implemented as one or more software code modules of the controlling program 190 resident in the memory 180 and being controlled in its execution by the processor 185.

The method 600 begins at determining step 610, where if the controlling program 190, under execution of the processor 185, determines that the candidate fill is suitable for stitching based on a set of criteria, then the method 600 proceeds to incrementing step 625. Otherwise, the method 600 proceeds to setting step 615. The set of criteria may be pre-determined. In one implementation, the set of criteria may include that a fill is suitable for stitching if the fill is a bitmap fill, if the dimensions of the source bitmap are less than a first predetermined size and if the dimensions of the transformed source bitmap are less than a second predetermined size.

At setting step 615, the fill for the currently processed object is set to the candidate fill and the method 600 concludes.

At incrementing step 625, the stitching activation count parameter configured within memory 180 is incremented by the controlling program 190. At checking step 630, if the controlling program 190 determines that the fill combination active flag has been set then the method 600 proceeds to compatible stitcher object step 645. Otherwise, the method 600 proceeds to determining step 635.

At step 645, the controlling program 190 attempts to determine a stitcher object in the list of active stitcher objects that are suitable for combination with the candidate fill. A method 700 of determining a stitcher object in the list of active stitcher objects that is suitable for combination with the candidate fill, as executed at step 645, will be described in further detail below with reference to FIG. 7.

At determining step 635, if a predetermined activation threshold has been exceeded, then the method 600 proceeds to step 640. Otherwise, the method 600 proceeds to step 615. The activation threshold may be a simple threshold, for example, that the activation count is greater than a predetermined value. Alternatively, the activation threshold may be a more complex threshold, for example that the ratio of the activation count to the total number of objects processed is greater than a predetermined value.

At activating step 640, the controlling program 190, under execution of the processor 185, sets the fill combination active flag configured within memory 180.

At determining step 650, if the controlling program 190 determines that a suitable existing stitcher object was determined in step 645, then the method 600 proceeds to step combining step 655. Otherwise, the method 600 proceeds to incrementing step 665.

In one implementation, a Found_Stitcher variable may be configured within memory 180. In this instance, the controlling program 190 may determine that a suitable Stitcher Object was found if the Found_Stitcher variable is not "None".

At combining step 655, the candidate fill is combined with the stitcher object determined to be suitable at step 645. A method 800 of combining a candidate fill with a stitcher object, will be described in further detail below with reference to FIG. 8. Once the candidate fill has been combined with the stitcher object, the method 600 concludes.

If controlling program 190 determines in step 650 that there is no existing stitcher object in the list of active stitcher objects that is suitable for combination with the candidate fill, processing moves from step 650 to incrementing step 665. At step 665, the controlling program 190, under execution of the processor 185, increments the deactivation count parameter configured within memory 180. Processing then moves from step 665 to step 670, where if the controlling program 190, under execution of the processor 185, determines that the deactivation threshold has been exceeded, then the method 600 proceeds to deactivation step 675. Otherwise, the method 600 proceeds to step creation step 680. In one implementation, the deactivation threshold is determined to be exceeded if the ratio of the value of the deactivation count parameter to the value of the activation count parameter configured in memory 180 is greater than a predetermined value.

At step 675, the fill combination is deactivated. In particular, at step 675, the fill combination active flag configured within memory 180 is cleared by the controlling program 190. Further, the activation count and the deactivation count parameters are set to zero (0). Processing then moves to step 615, as described above.

Alternatively, as described above, if the deactivation threshold has not been exceeded, processing moves from step 670 to creating step 680, where the controlling program 190 creates a new stitcher object. A stitcher object comprises a reference to a bitmap fill, data indicating which pixels have been written to, and a bounding box indicating the active area of the stitcher object. When the stitcher object is created, in one implementation, a bounding box is created with pre-determined x and y dimensions, a bitmap is initialized to transparent white pixels, and all pixels are marked as 'NOT WRITTEN'. Once the new stitcher object has been created, the method 600 moves to combining step 655. At combining step 655, the candidate fill is combined with the stitcher object, and then on to setting step 660. At setting step 660, the fill for the currently processed object is set to the bitmap fill referenced by the stitcher object, and the method 600 concludes.

Figure 7:
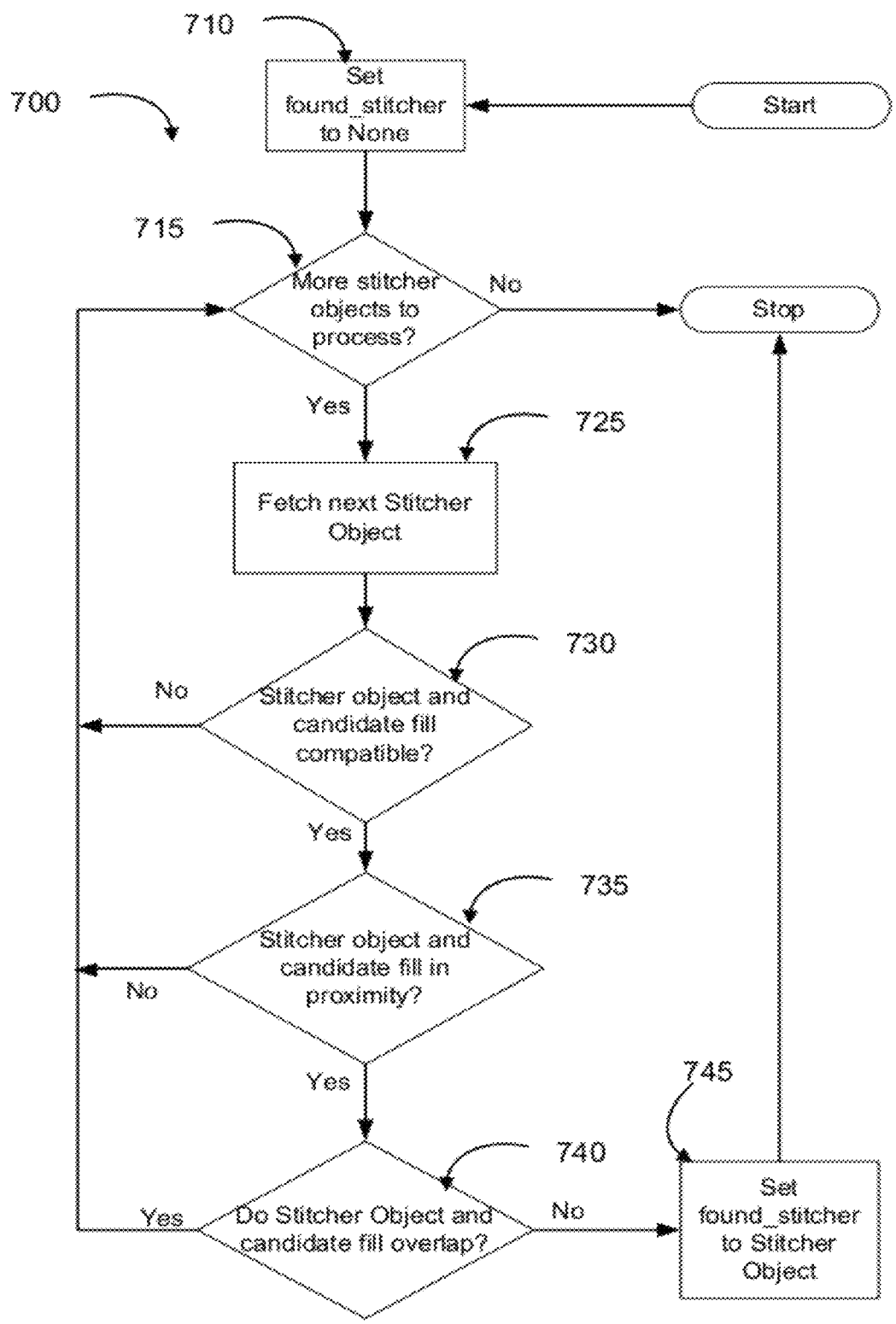
FIG. 7 is a schematic flow diagram showing a method of determining a stitcher object that is suitable for combination with the candidate fill.

The method 700 of determining a stitcher object in the list of active stitcher objects that is suitable for combination with the candidate fill, as executed at step 645, will now be described in detail with reference to FIG. 7. The method 700 may be implemented as one or more software code modules of the controlling program 190 resident in the memory 180 and being controlled in its execution by the processor 185.

The method 700 begins at step 710, where the controlling program 190, under execution of the processor 185, sets the Found_Stitcher variable configured within memory 180 to None.

At checking step 715, the controlling program 190 examines the list of active stitcher objects configured within the memory 180, and determines whether there are any objects that have not yet been processed. If all objects in the list of active stitcher objects have been processed, then the method 700 concludes.

Alternatively, if the controlling program 190 determines at step 715, that there are unprocessed stitcher objects in the list of active stitcher objects, then the method 700 proceeds to fetching step 725. At step 725, the controlling program 190 fetches a next unprocessed stitcher object in the list of active stitcher objects configured within the memory 190.

Then at compatibility checking step 730, if the controlling program 190 determines that the bitmap fill of the stitcher object fetched at step 725 is compatible with the candidate fill, based on a set of pre-determined criteria, then the method 700 proceeds to proximity determining step 735. For example, fills are compatible if the fills are defined in the same colour space and have the same bit depth. If the bitmap fill of the stitcher object is not compatible with the candidate fill, then the method 700 returns to step 715, as described above.

In proximity determining step 735, the controlling program 190 determines the proximity of the stitcher object and candidate fill. In one implementation, the proximity of the stitcher object to the candidate fill is measured by determining the distance between the bounding box of the candidate fill and the bounding box of the stitcher object. The bounding box for the candidate fill may either be determined from a PDL object currently being processed, if the PDL object contains a bounding box. Alternatively, the bounding box for the candidate fill may be determined using the affine transform of the candidate fill to transform the dimensions of the candidate fill into a page space, and take the bounding box of the transformed points. In one implementation, the stitcher object and the candidate fill are considered to be in proximity if the bounding box of the candidate fill is completely contained within the bounding box of the stitcher object. Otherwise, the stitcher object and the candidate fill are considered to not be in proximity. Fills which are in proximity will require less memory to combine than fills which are not in proximity. For example, if four small images, each at a corner of a page, were combined, the number of pixels in the combined image would be equal to the number of pixels on the page, a number much greater than the number of pixels in the four images. This means that if the images are combined, memory usage will increase.

In one implementation, the size of the bounding box of the candidate fill can be changed adaptively according to the characteristics of the page. Such adaptive and on-the-fly modification of the size of the bounding region may be done as the objects are obtained in obtaining step 530. Different characteristics of a page can affect the size of the bounding box. For example, as the number of objects at a particular area on the page increases, thus increasing the complexity of the particular area, the bounding region is slightly reduced so as not to overlap with as many other bounding boxes of other candidate fills on the page. The complexity of the object and the fill associated with the object can also affect the size of the bounding box. A complexity of a fill is determined by the number of different colours and the type of operators involved in the compositing stack. Thus, if the number of colours in the fill exceeds a threshold, which can be pre-determined to a fixed number, for example, the fill is said to be complex. A complexity measure can also be calculated that takes into account the number of objects in a particular area on the page, the number of fills involved in the area, the number of colours in each fill and the operators involved in the fills, for example. Subsequently, the bounding region of the fill is determined based on such a complexity measure as the object is received. In particular, the size of the bounding region may be affected by the complexity measure. Determining the bounding region based on a complexity measure reduces the complexity of the combining process 655.

If the controlling program 190 determines at step 735 that the stitcher object and the candidate fill are not in proximity, then the method 700 returns to step 715, as described above. If the stitcher object and the candidate fill are in proximity, then the method 700 proceeds to overlap determining step 740.

At step 740, if the controlling program 190 determines that the stitcher object and the candidate fill overlap, then the method 700 returns to step 715 as described above. Otherwise, the method 700 concludes. In one implementation, at step 740, the controlling program 190 determines if any data is written during previous stitching operations into an area of the stitcher object where the bounding box of the candidate fill overlaps the bounding box of the stitcher object. If the controlling program 190 determines that no information has previously been written to the overlapping area, then the stitcher object and the candidate fill are considered to be non-overlapping. However, if information has previously been written to the overlapping area, then the stitcher object and the candidate fill are considered to be overlapping.

At step 745, the Found_Stitcher variable configured within the memory 190 is set to the stitcher object and the method 700 concludes.

Figure 8:
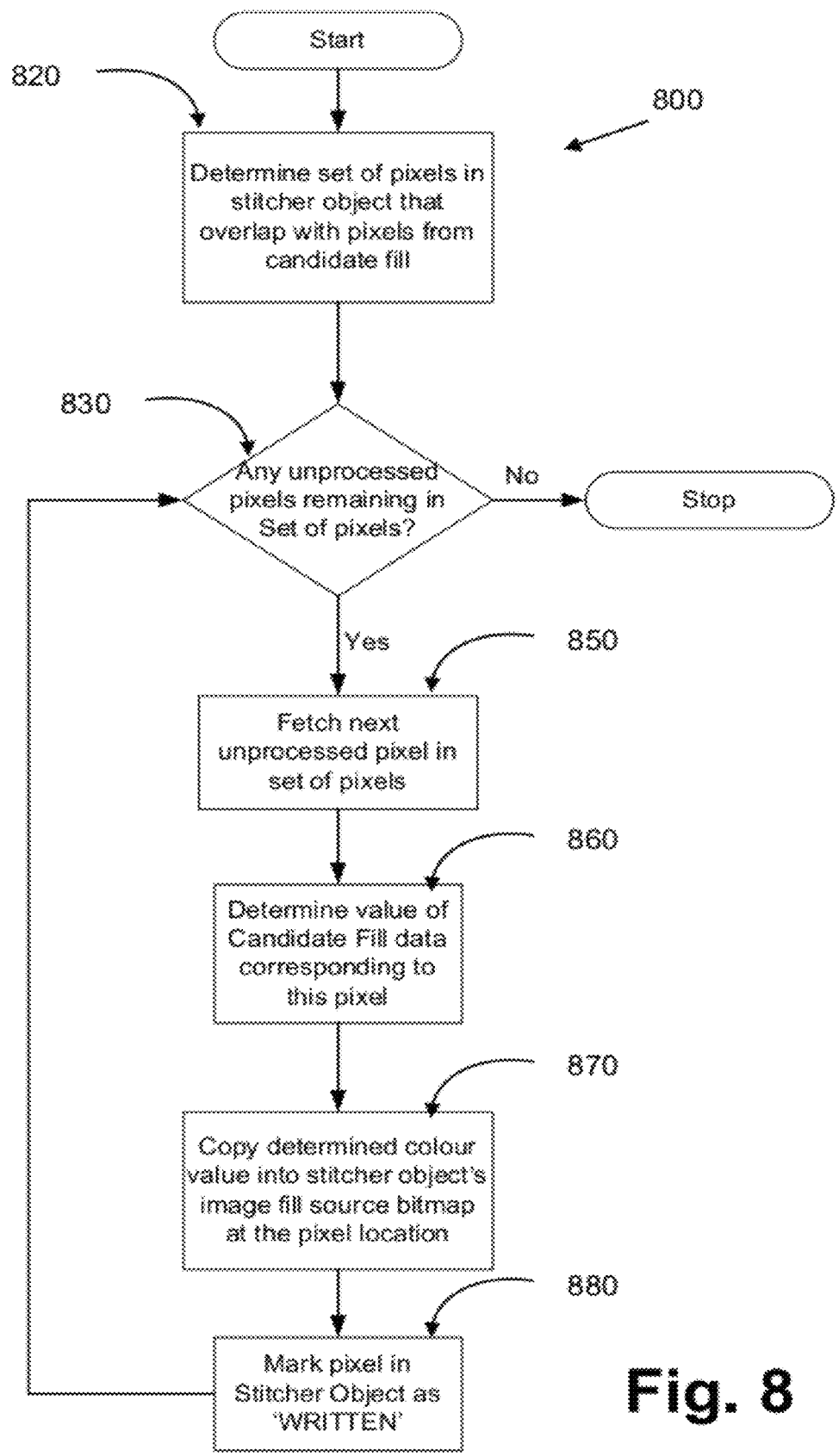
FIG. 8 is a schematic flow diagram showing a method of combining a candidate fill with a stitcher object, as executed in the method of FIG. 3.

The method 800 of combining a candidate fill with a stitcher object, as executed at step 655, will be described in detail below with reference to FIG. 8. The method 800 begins at determining step 820, where the controlling program 190 determines a set of stitcher object pixels in the area of overlap between the stitcher object and the candidate fill. All of the pixels in the area of overlap are 'unprocessed'.

At checking step 830, if the controlling program 190 determines that there are unprocessed pixels remaining in the set of pixels determined in step 820, then the method 800 proceeds to step 850. Otherwise, if all pixels in the set of pixels determined in step 820 have been processed, then the method 800 concludes.

At fetching step 850, the controlling program 190, under execution of the processor 185, fetches the next unprocessed pixel. Then at determining step 860, the controlling program 190 determines the pixel colour value of the candidate fill corresponding to the location of the fetched pixel. For a bitmap fill, at step 860, the controlling program 190 performs an affine transform between the unprocessed pixel and the source bitmap space of the candidate fill to obtain a source location. The colour value of the source bitmap at that source location may then be determined.

At copying step 870, the colour value determined in step 860 is copied into the bitmap fill of the stitcher object at the unprocessed pixel location. The method 800 then proceeds to marking step 880, where the controlling program 190 marks the fetched pixel as 'WRITTEN' and stores the pixel in the memory 180. Processing then returns to step 830 as described above.

Figure 9:
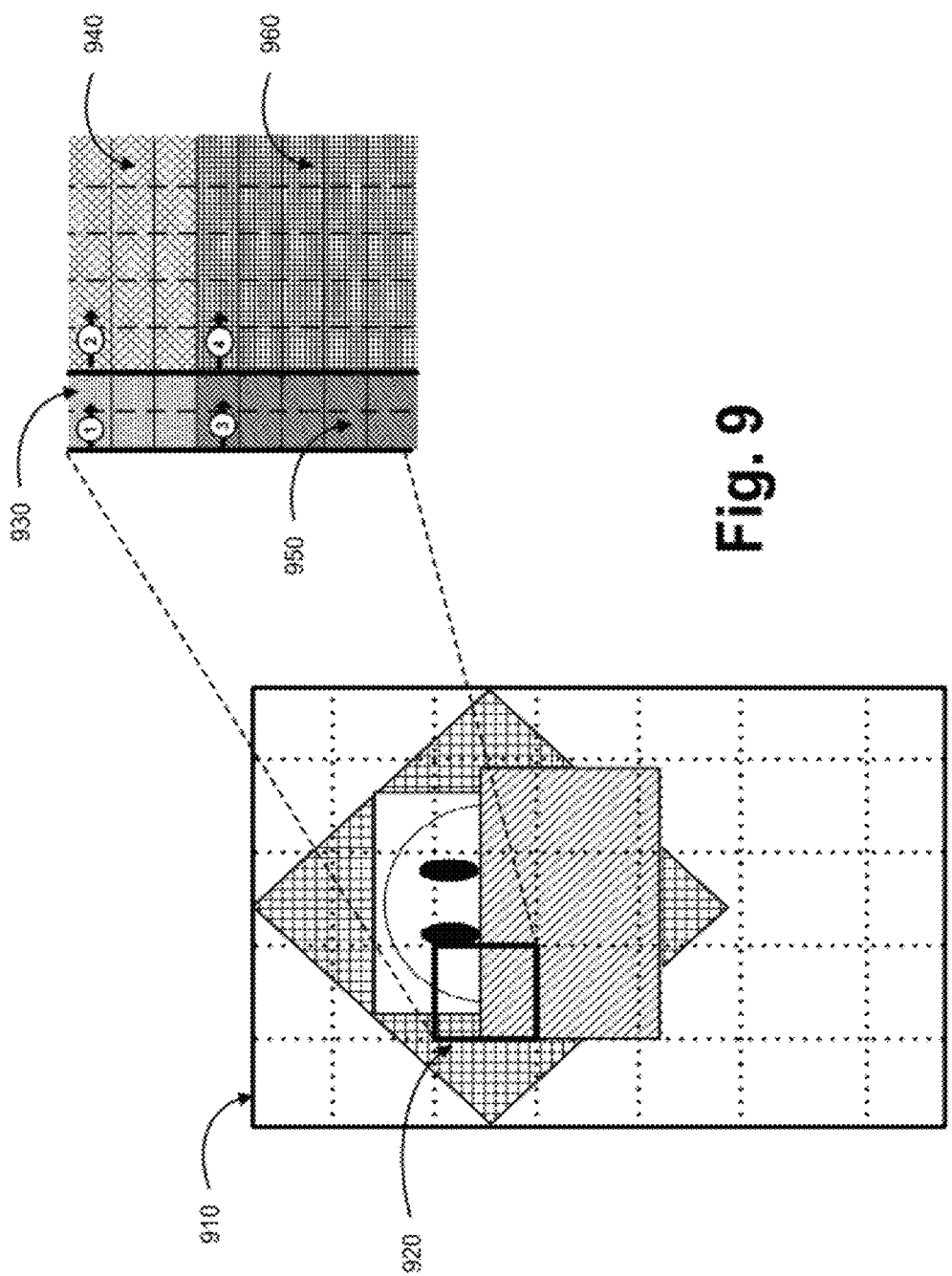
FIG. 9 shows a tiled fillmap intermediate representation for the page shown in FIG. 3.

Referring once again to FIG. 2, once the display list (or first intermediate format page representation 250) has been created, the display list may be transformed 230 into a tiled fillmap representation 260. FIG. 9 shows a tiled fillmap representation 910 of the example page 310 of FIG. 3. In the example of FIG. 9, fillmap tile 920 is at position (1, 2) expressed in (column, row) form. The contents of fillmap tile 920 are shown expanded on the right hand side of FIG. 9. Four regions 930, 940, 950 and 960 in fillmap tile 920 reference fill compositing sequences with indices one, two, three, and four, respectively.

Figure 10:
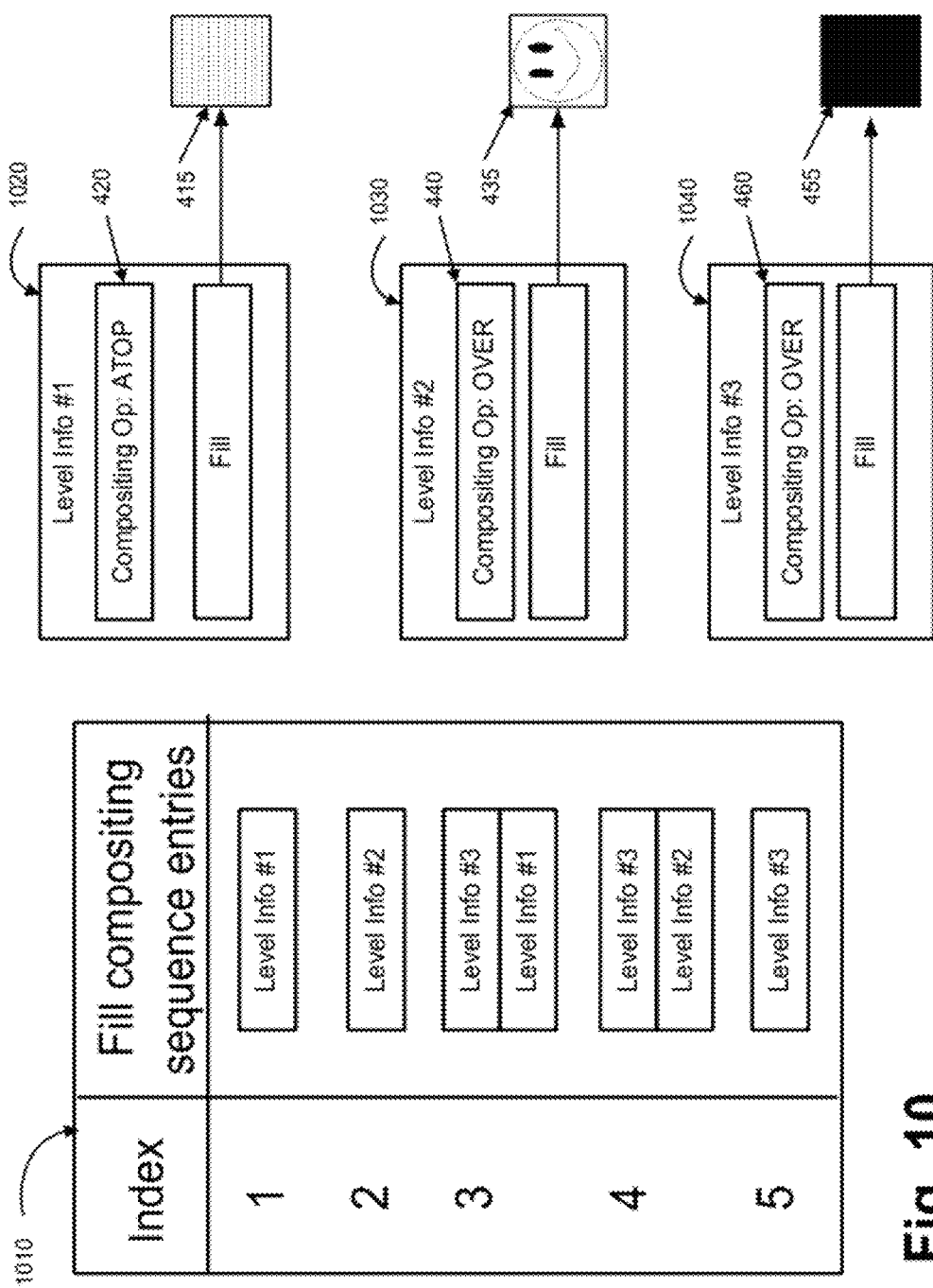
FIG. 10 shows a table of fill compositing sequences and corresponding level information for the tiled fillmap intermediate representation shown in FIG. 9.

FIG. 10 shows a table of fill compositing sequences 1010 and corresponding level information 1020, 1030 and 1040 for the tiled fillmap 910. Level Info #1 1020 contains rendering information corresponding to the opaque diamond object 320 of FIG. 3. Level Info #1 1020 references the linear blend fill 415 and the compositing operator ATOP 420. Level Info #2 1030 contains the rendering information corresponding to the opaque low resolution source bitmap object 330. Level Info #2 1030 references the low-resolution bitmap source fill 435, and has the compositing operator OVER 440. Level Info #3 1040 contains the rendering information corresponding to the semi-transparent flat object 340. Level Info #3 1040 references a flat grey source fill 455, and has the compositing operator OVER 460.

If two objects reference identical fills and the same compositing operator, the two fills are able to reference the same level information. Two objects which reference the same stitcher fill can, if the fills have the same compositing information, reference the same identical level information. Any regions of the tiled fillmap information that are produced by two such objects alone, without overlap with other objects, will reference the same fill compositing sequence.

Figure 11:
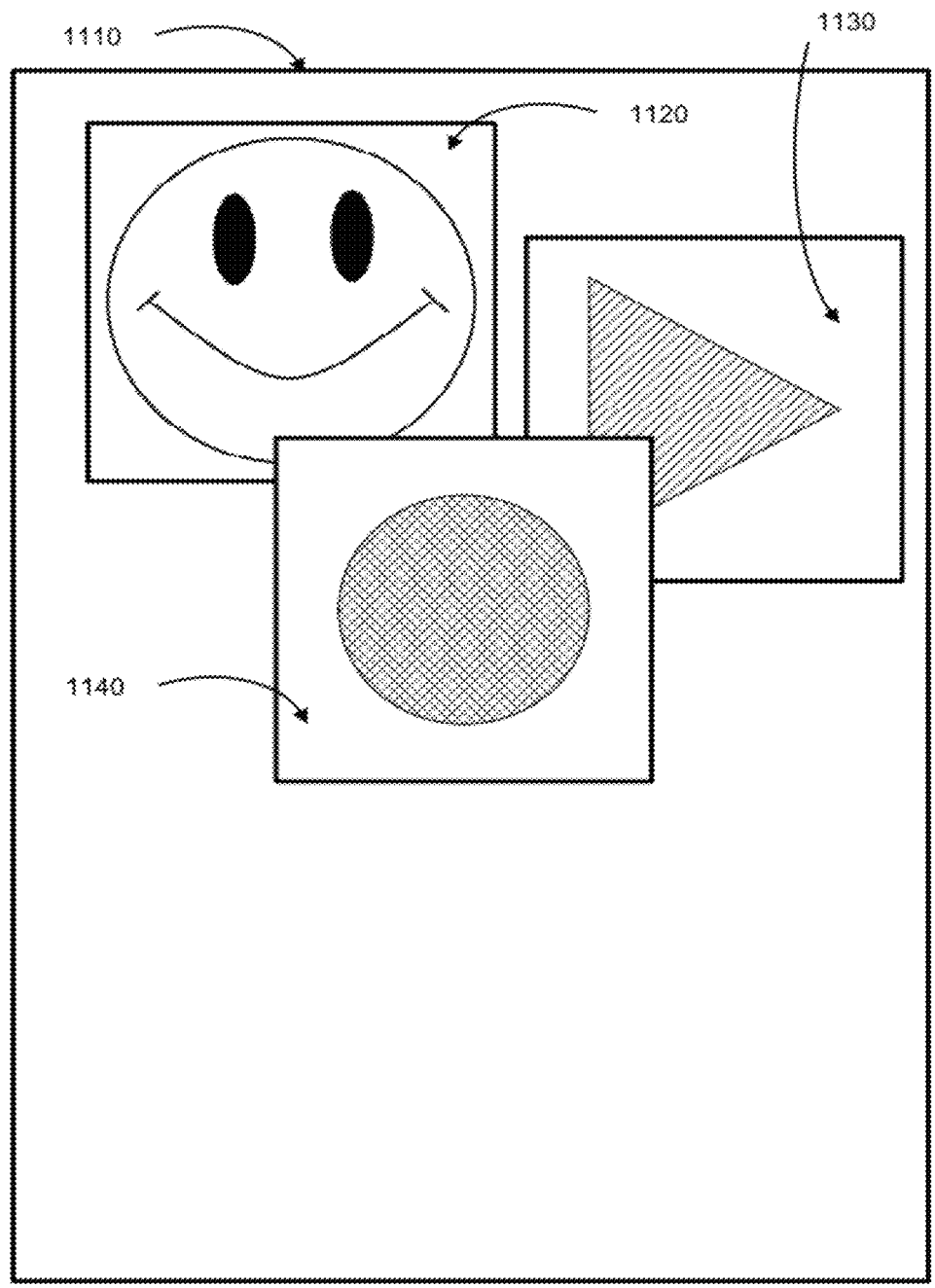
FIG. 11 shows an example PDL page.

The methods described above will now be further described by way of example with reference to FIGS. 11 to 15. FIG. 11 shows an example PDL page 1110. The page 1110 contains three PDL objects—a bottom-most object 1120 which is an opaque bitmap, where the source bitmap is an image of a face. The page 1110 also contains a second object 1130 which is an opaque bitmap, where the source bitmap is an image of a triangle. The page 1110 also contains a third object which is an opaque bitmap 1140, where the source bitmap is an image of a circle.

Figure 12:
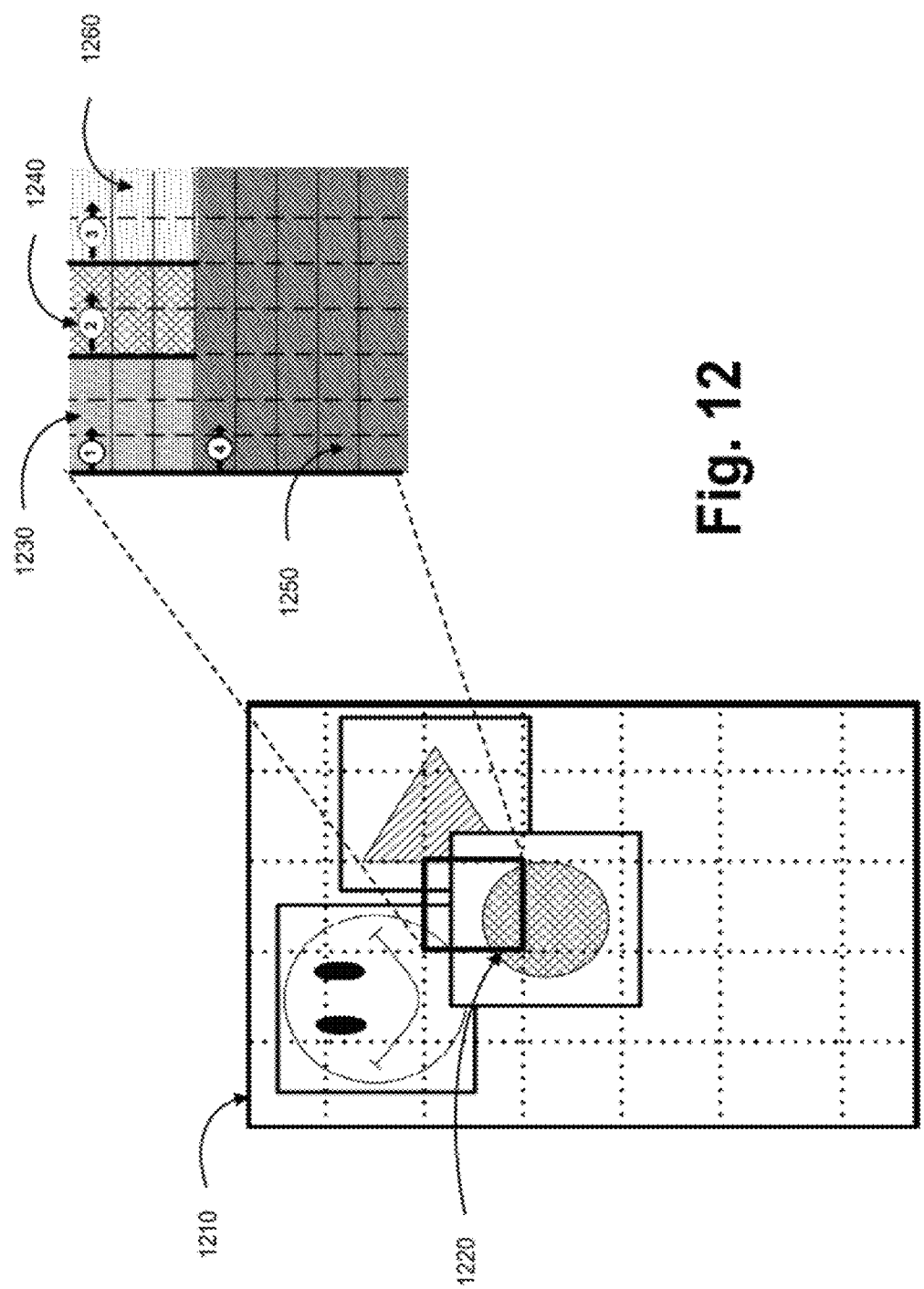
FIG. 12 shows a tiled fillmap intermediate representation for the page shown in FIG. 11.

A tiled fillmap representation 1210 of the example page 1110 when processed without fill combination is shown in FIG. 12. Fillmap tile 1220 is at position (2, 2) expressed in (column, row) form. The contents of fillmap tile 1220 are shown expanded on the right hand side of FIG. 12. As seen in FIG. 12, the four regions 1230, 1240, 1250 and 1260 in fillmap tile 1220 reference the fill compositing sequences with indices one, two, three, and four respectively.

Figure 13:
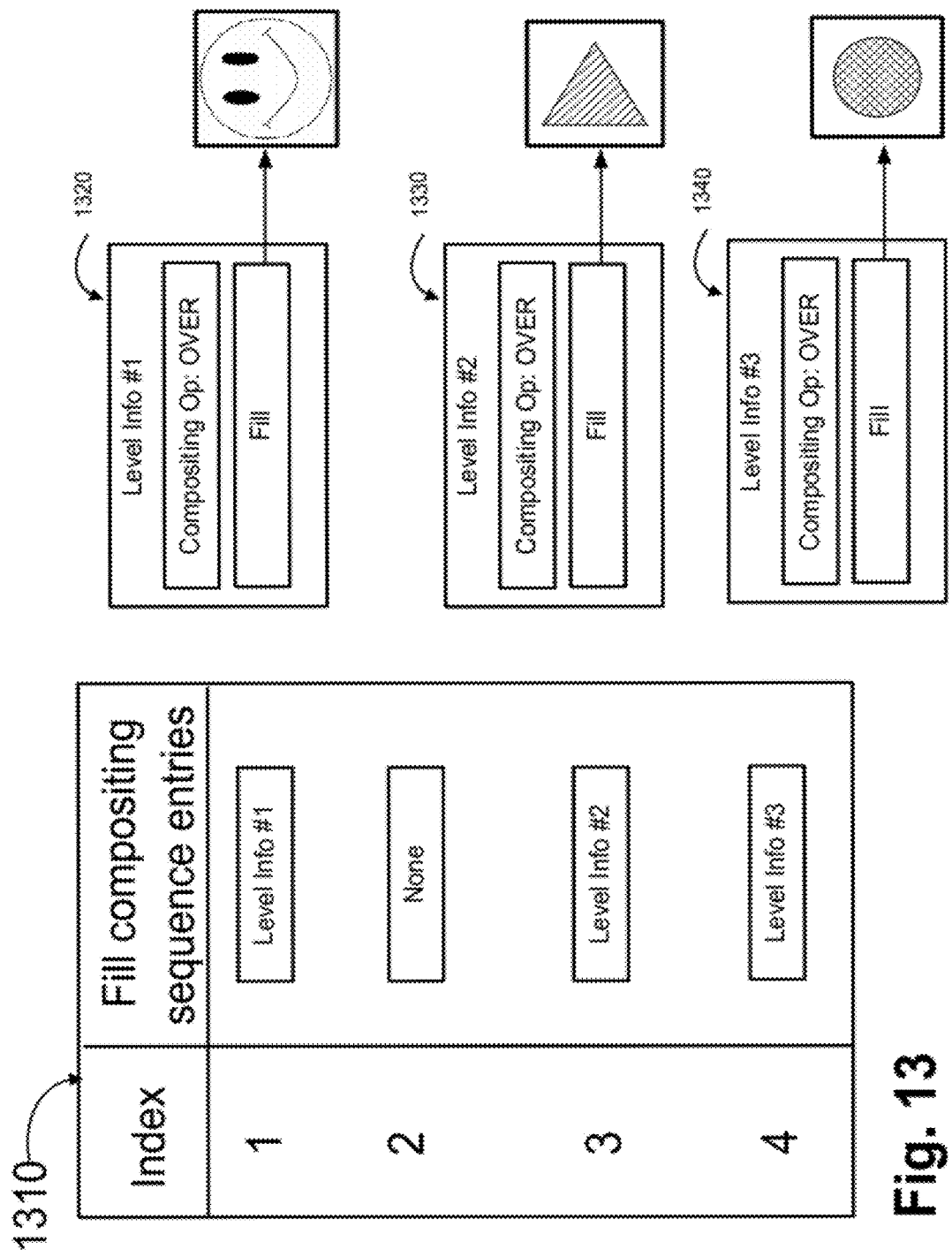
FIG. 13 shows the table of fill compositing sequences and corresponding level information for the tiled fillmap intermediate representation shown in FIG. 12.

FIG. 13 shows the table of fill compositing sequences 1310 and corresponding level information 1320, 1330, 1340 for the tiled fillmap 1210. Level Info #1320 contains the rendering information corresponding to the object referencing the face bitmap 1120. Level Info #2 1330 contains the rendering information corresponding to the object referencing the triangle bitmap 1130. Level Info #3 1340 contains the rendering information corresponding to the object 1140 referencing the circle bitmap.

Figure 15:
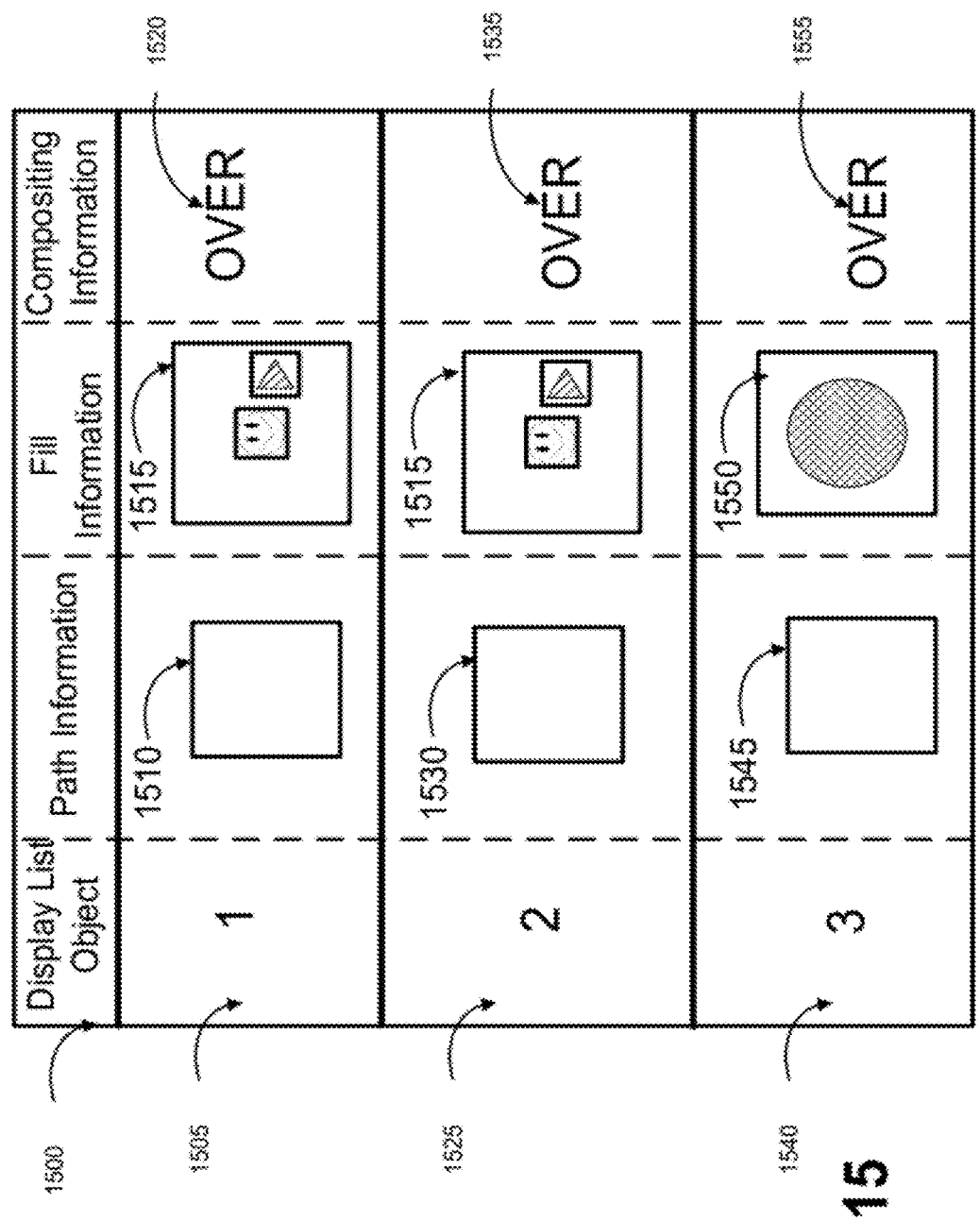
FIG. 15 shows a display list intermediate page representation for the page shown in FIG. 11.

When an exemplary fill combination process is performed on the example page of FIG. 11, the activation threshold is considered to be zero (0), and the dimensions of each source bitmap are less than a maximum allowable for stitching. All of the bitmaps of FIG. 11 have the same colour space and bit depth. The page 1110 may be processed in accordance with the method 500 in order to generate an intermediate page representation in the form of a display list 1500 as shown in FIG. 15. The method 500 begins by initializing the stitching parameters as described above with reference to step 515. The list of active stitcher objects configured within memory 180 is set to None, the fill combination active flag is cleared, and the activation count and the deactivation count are set to zero (0).

The PDL object referencing the face bitmap 1120 is processed first in accordance with the method 500, and is examined to determine if the face bitmap is suitable for stitching (as at step 610 of the method 600). The dimensions of the face bitmap corresponding to the object 1120 are less than the maximum allowed for stitching, so the object 1120 is considered suitable for stitching. The activation count parameter is incremented (as at step 625), and as the activation count parameter is larger than zero (0), the fill combination active flag configured within memory 180 is set (as at step 640). As the list of active stitcher objects is empty, no suitable stitcher object is determined (as at step 645 of the method 600). Processing of the object 1120 continues and the deactivation count is incremented (as at step 665). However, the deactivation threshold will not be exceeded (as at step 670), and so a new stitcher object is created (as at step 680) and added to the list of active stitcher objects configured within the memory 180. The stitcher object will hereafter be denominated "stitcher object X".

Figure 14A:
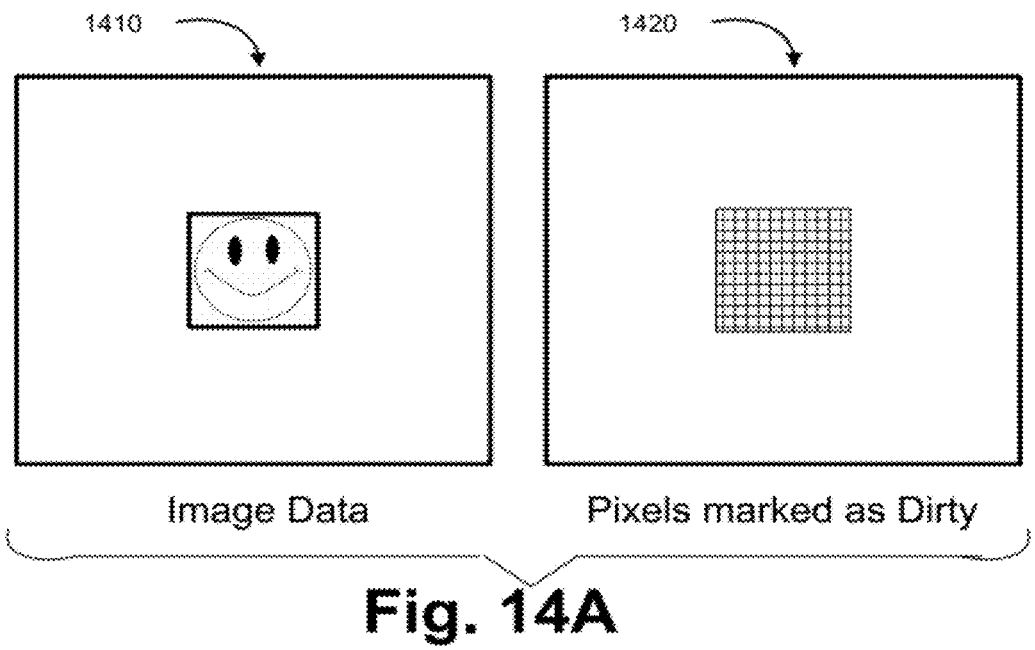
FIG. 14A shows the state of a stitcher object during processing of the page of FIG. 11 in accordance with the method of FIG. 5.

The bitmap Fill colour space and bit depth of stitcher object X are set to the colour space and bit depth of the face bitmap corresponding to the object 1120. The face bitmap is then combined with the bitmap fill of the stitcher object X (as at step 655 of the method 600). FIG. 14A shows the bitmap data 1410 for the stitcher object X and the pixels 1420 in stitcher object X that have been marked as "WRITTEN".

In accordance with the example, the next object to be processed is the PDL object 1130 referencing the triangle bitmap. The dimensions of the triangle bitmap are less than the maximum allowed for stitching, so the triangle bitmap is considered suitable for stitching (as per step 610 of the method 600). As the fill activation flag is set, processing proceeds directly to determine a suitable stitcher object from the list of active stitcher objects configured within the memory 180.

The triangle bitmap object 1130 is found to be compatible with stitcher object X (as at step 730). The triangle bitmap is wholly contained within the bounding box of stitcher object X which may be determined at step 735, since the triangle bitmap object 1130 does not overlap any pixels in stitcher object X marked as dirty as determined in step 740. Therefore, stitcher object X is selected as the stitcher object to use for combination.

Figure 14B:
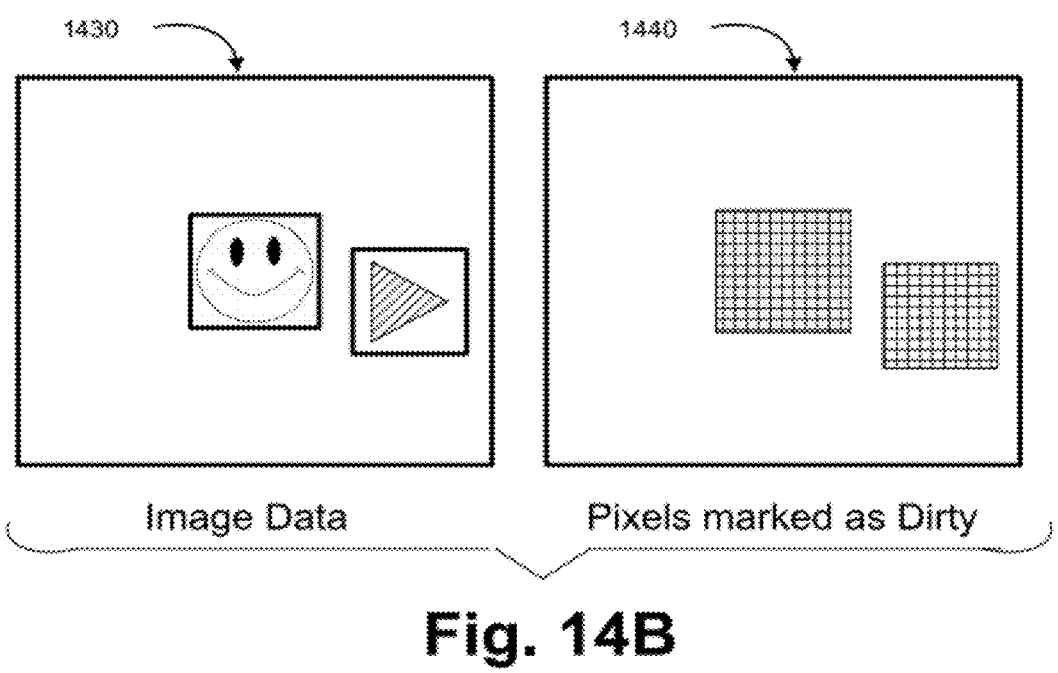
FIG. 14B shows the updated state of a stitcher object during the processing of the page shown in FIG. 11.

The triangle bitmap object 1130 is then combined with the bitmap fill stitcher object X as at step 655. FIG. 14B shows the state of the bitmap data 1430 for the stitcher object X. FIG. 14B also shows the pixels 1440 in stitcher object X that have been marked as dirty after processing the object referencing the triangle bitmap object 1130.

The next object to be processed is the object 1140 referencing the circle bitmap. The dimensions of the circle bitmap object 1140 are less than the maximum allowed for stitching, so the object 1140 is considered suitable for stitching (as at step 610 of the method 600). As the fill activation flag is set, processing proceeds directly to determine a suitable stitcher object from the list of active stitcher objects as at step 650). The circle bitmap object 1140 is determined to be compatible with stitcher object X (as at step 730), as the circle bitmap object 1140 is wholly contained within the bounding box of the stitcher object X (as determined in Step 735). However, the circle bitmap object 1140 overlaps pixels in stitcher object X marked as dirty (as determined in step 740). Therefore, the stitcher object X is not selected, and no compatible stitcher object is determined. The deactivation count parameter configured within the memory 180 is incremented (as at step 665), and the deactivation threshold parameter is determined to have been exceeded (as at step 670). The fill combination active flag configured within the memory 180 is therefore cleared, and the activation and deactivation counts are set to zero (0) as at step 675.

FIG. 15 shows the display list 1500 resulting from processing the page 1110 from FIG. 11 in accordance with the method 500. The Display List Object Entry 1 1505 corresponds to the first object 1120, and references the square shape path 1510, references the bitmap fill 1515 from the stitcher object X and references the compositing operator OVER 1520.

Display List Object Entry 2 1525 corresponds to the second object 1130, and references a square path 1530, references the bitmap fill 1515 from stitcher object X and references the compositing operator OVER 1535.

Display List Object Entry 3 1540 corresponds to the third object 1140 and references a square path 1545, references the circle bitmap fill 1550 from the third object 1140 and references the compositing operator OVER 1555. As seen in FIG. 15, both Display List Objects 1 (1505) and 2 (1525) refer to the same fill information 1515.

Figure 16:
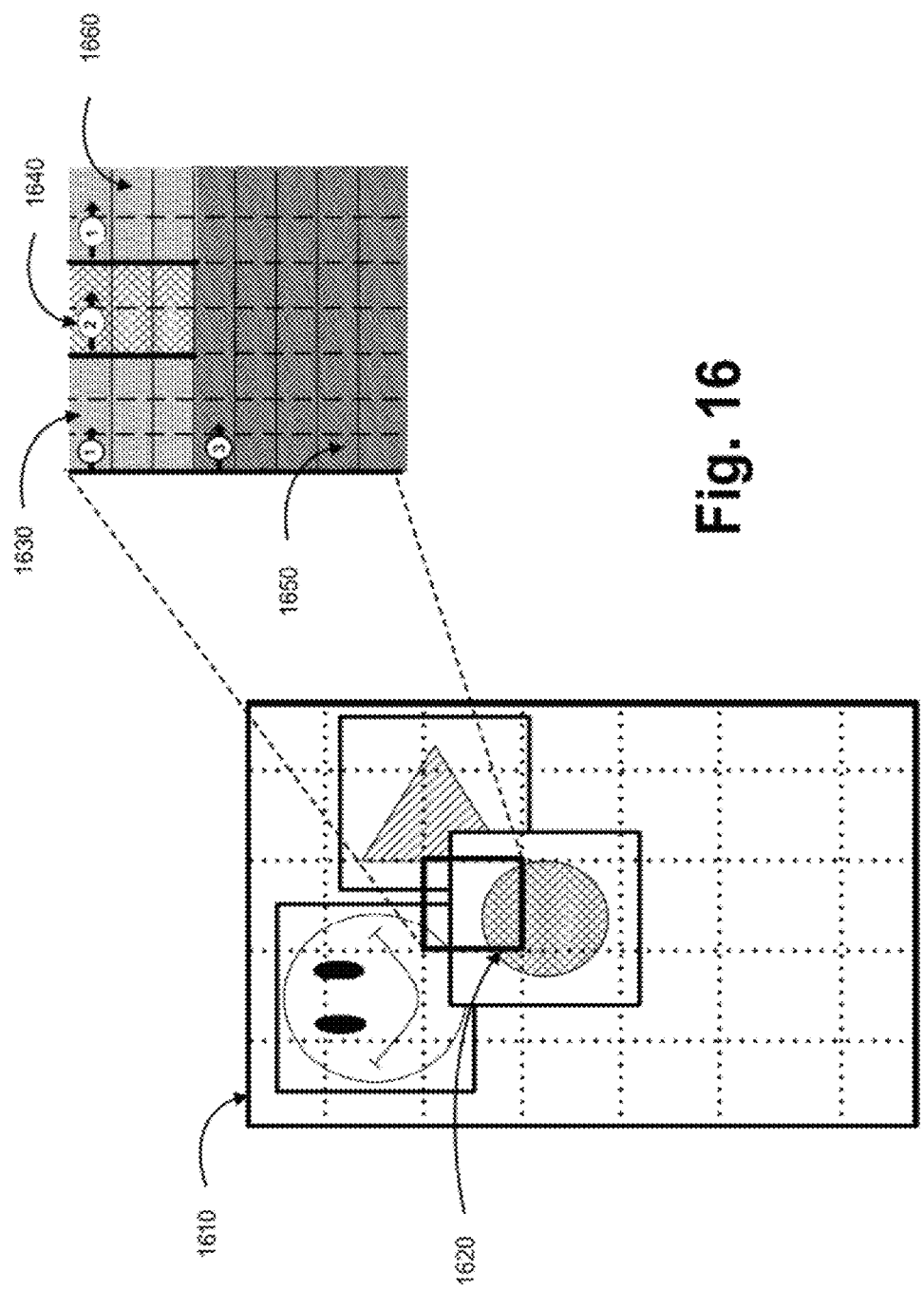
FIG. 16 shows another tiled fillmap intermediate representation for the page shown in FIG. 11.

A tiled fillmap representation 1610 of the example page 1110 is shown in FIG. 16. Fillmap tile 1620 is at position (2, 2) expressed in (column, row) form. The contents of fillmap tile 1620 are shown expanded on the right hand side of FIG. 16. As seen in FIG. 16, the four regions 1630, 1640, 1650 and 1660 in fillmap tile 1620 reference the fill compositing sequences with indices one, two, one, and three respectively.

Figure 17:
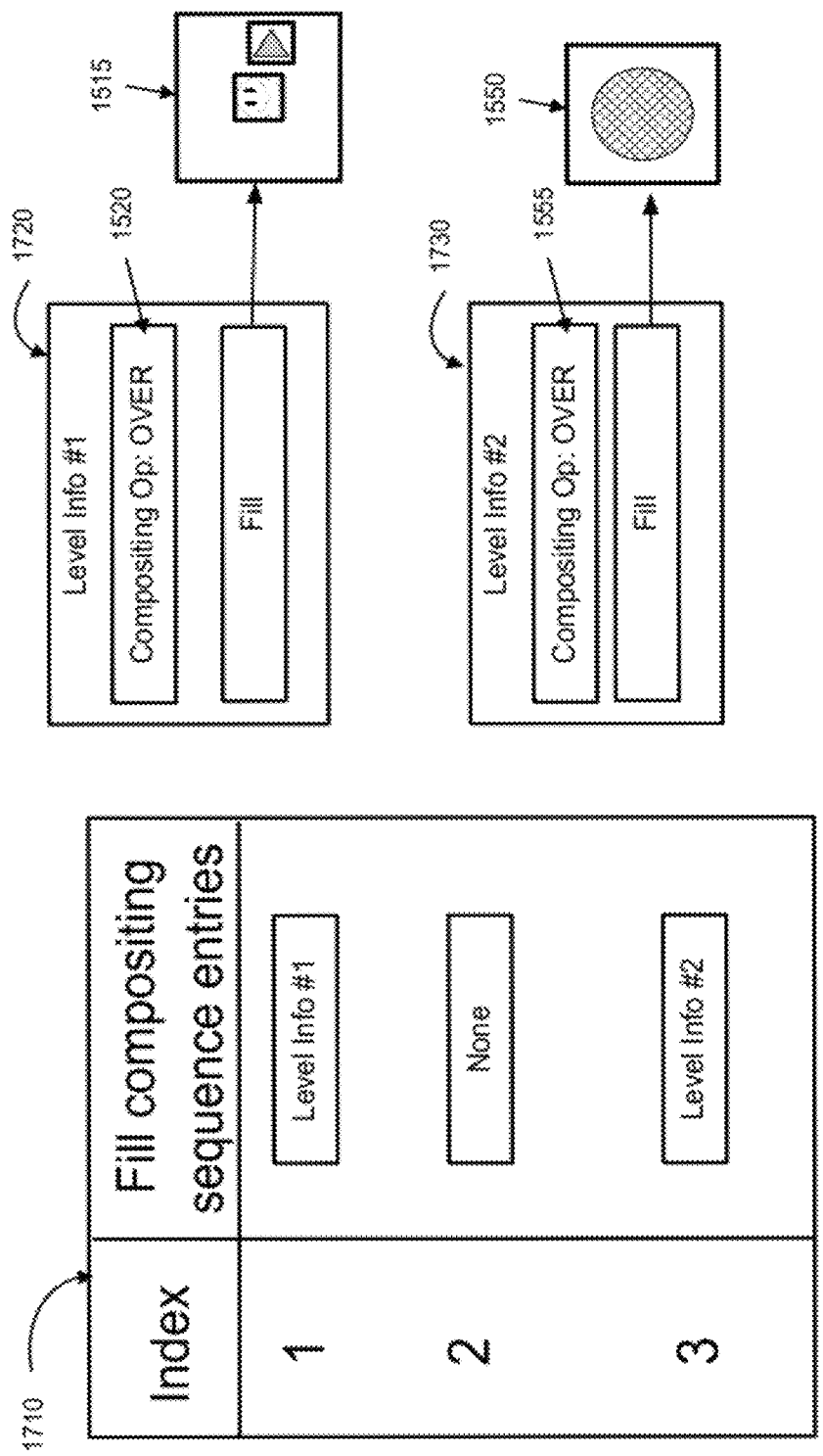
FIG. 17 shows the table of fill compositing sequences and corresponding level information for the tiled fillmap intermediate representation shown in FIG. 16.

FIG. 17 shows the table of fill compositing sequences 1710 and corresponding level information 1720, 1730 for the tiled fillmap 1610. Level Info #1 1720 contains the rendering information corresponding to both the object referencing the face bitmap 1120 and the object referencing the triangle bitmap 1130. The Level Info #1 1720 references the bitmap fill 1515 for the stitcher object X and the compositing operator OVER 1520. Level Info #2 1730 contains the rendering information corresponding to the object 1140 referencing the circle bitmap. The Level Info #2 references the circle bitmap 1550, and has the compositing operator OVER 1555.

Comparing the table of fill compositing sequences 1310 with the table of fill compositing sequences 1710, it can be seen that implementing the fill combination method for the example page 1110 has reduced the number of fill compositing sequences from four to three. It can also be seen that the total number of level information data has reduced from three (1320, 1330, 1340) to two (1720, 1730). This means that the total memory usage required by the intermediate tiled fillmap has been reduced.

Figure 18:
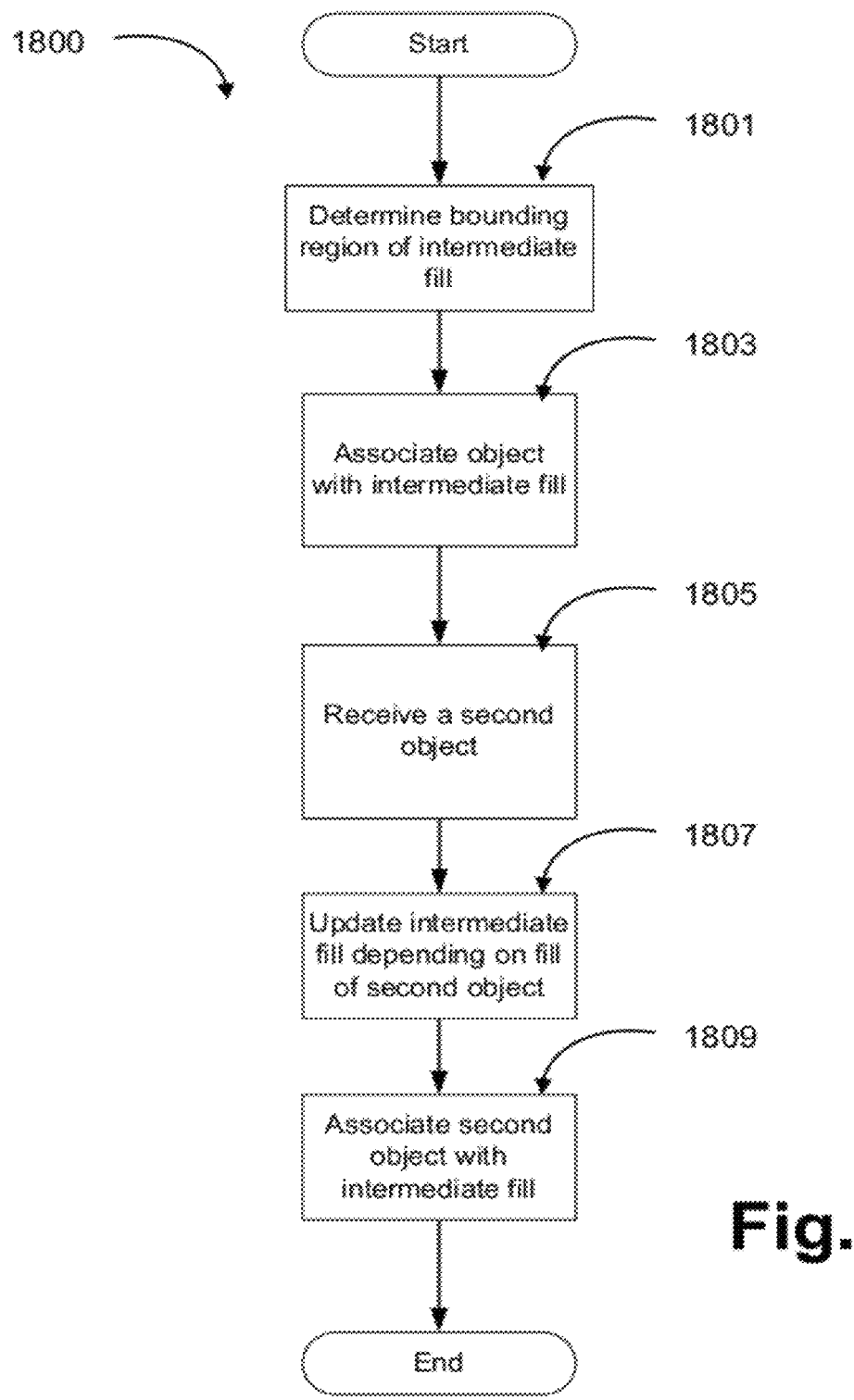
FIG. 18 is a flow diagram showing a method of associating an intermediate fill with a plurality of objects, each of the objects being associated with a fill.

FIG. 18 is a flow diagram showing a method 1800 of associating an shared intermediate fill with a plurality of objects, each of the objects being associated with a fill. The method 1800 may be implemented as one or more software code modules of the controlling program 190 resident in the memory 180 and being controlled in its execution by the processor 185. As described above, each of the objects may be a page description language (PDL) object of a page such as the page 310. In this instance, the controlling program 190 receives the description of the page 310 from the software application 133 and may store the description in memory 180. Objects in the page description are placed into a first shared intermediate format page representation in the form of a display list, as described above, configured within the memory 180. Each object in the display list references fill data, path data and compositing instructions. As also described above, in one implementation, the controlling program 190 may process the page description language objects to determine if any of fills may be combined into an shared intermediate fill. Such an intermediate fill is a fill that is shared by a plurality of objects with nearby fills. In other words, if the fills of the objects are in proximity to one another, an intermediate fill is created to replace the fills of several objects to reduce the resources needed compared to processing individual fills.

The method 1800 begins at step 1801, where the controlling program 190 performs the step of determining a bounding region (or bounding box) of the shared intermediate fill based on a fill of a first of the plurality of objects. As described above, the bounding box for the fill may either be determined from the object currently being processed, if the object contains a bounding box. Alternatively, the bounding box for the fill may be determined using the affine transform of the fill to transform the dimensions of the fill into a page space, and take the bounding box of the transformed points.

At the next step 1803, the controlling program 190 performs the step of associating the first object with the shared intermediate fill. In one implementation, the controlling program may associate the first object with the intermediate fill by setting the fill property of the display list entry corresponding to the PDL object currently being processed. Then at the next step 1805, the controlling program performs the step of receiving a second object. As described above, the second object may be referred to as a "stitcher object."

The method 1800 continues at the next step 1807, where the controlling program 190 performs the step of updating the shared intermediate fill based on a fill of the second object if: (a) the fill of the second object is contained within the bounding region; and (b) the fill of the second object is non-overlapping with the fill of the first object. Finally, at step 1809, the controlling program 190 performs the step of associating the second object with the updated shared intermediate fill. The controlling program 190 may update the shared intermediate fill at step 1807 and associate the second object with the shared intermediate fill, in accordance with the method 700 and method 800, as described above with reference to FIGS. 7 and 8.

In an alternative implementation of the methods described above, the bounding box of the stitcher object may be initially set to the bounding box of the first bitmap fill combined with the stitcher object. A candidate fill and the stitcher object are determined to be in proximity if the distance between the bounding box of the candidate fill and the bounding box of the stitcher object is less than a predetermined minimum distance. When the candidate fill is combined with the stitcher object, the bounding box of the stitcher object is enlarged to encompass both the original bounding box of the stitcher object, and the bounding box of the candidate fill.

Figure 19A:
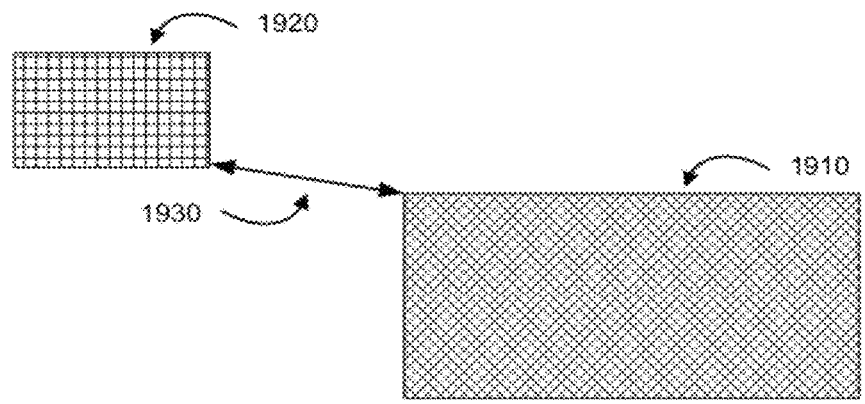
FIG. 19A and FIG. 19B show an example where the bounding box of the stitcher object and the candidate fill do not overlap.
Figure 19B:
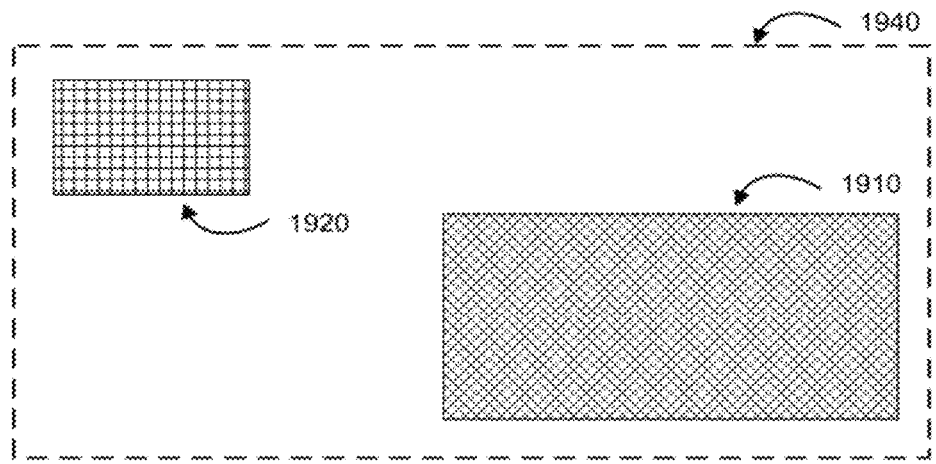

As an example FIG. 19A and FIG. 19B show that the bounding box of the stitcher object 1910 and the candidate fill 1920 do not overlap. The distance between the bounding box of the stitcher object 1910 and the candidate fill 1920 as indicated by the arrow 1930 is, less than the predetermined minimum distance. In this case, the candidate fill is combined with the stitcher object, and the bounding box of the stitcher object is updated to a new bounding box 1940 which encompasses both the bounding box 1910 of the original stitcher object and the bounding box 1920 of the candidate fill.

In another alternative implementation, stitching may be used to combine flat fills. In this case, the bounding box of the flat fill may be determined from the bounding box of a PDL object. Flat fills may then be combined with the stitcher object by copying the flat fill colour to the stitcher objects copied into the bitmap fill for the stitcher objects.

INDUSTRIAL APPLICABILITY

The arrangements described are applicable to the computer and data processing industries and particularly for the image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

This application claims priority from Australian Patent Application No. 2010-241218 filed Nov. 3, 2010, which is hereby incorporated by reference herein in its entirety.

The claims defining the invention are as follows:

1. A method of rendering a plurality of objects, the method comprising:
   receiving a display list representation comprising a first display list object associated with a first fill and a first path, and a second display list object associated with a second fill and a second path;
   determining a bounding region of a shared fill based on the first fill, wherein a size of the bounding region is affected by a complexity measure of at least one of the first object and the first fill;
   associating the first display list object with the shared fill by setting the first fill of the first display list object to the shared fill;
   updating the shared fill using the second fill in response to determining if the second fill is compatible with the first fill and the second fill is: (a) contained within the bounding region, and (b) non-overlapping with the first fill;
   associating the second display list object with the updated shared fill, the updated shared fill being shared, in the display list representation, by the first display list object and the second display list object; and
   rendering the first object and the second object using the first path and the second path associated with the updated shared fill.

2. The method according to claim 1, wherein the shared fill is updated using the second fill to reduce memory usage by the display list representation.

3. The method according to claim 1, wherein the shared fill is updated using the second fill to reduce a number of transformations required to render the display list representation.

4. The method according to claim 1, further comprising determining whether the second fill is suitable for updating the shared fill, wherein the second fill is suitable for updating the shared fill if a size associated with the second fill is below a predetermined threshold.

5. The method according to claim 4, further comprising:
   incrementing an activation count in response to determining that the second fill is suitable for updating the shared fill; and
   if the activation count exceeds a predetermined activation threshold, associating a flag with at least the second display list object to update the shared fill.

6. The method according to claim 5, wherein the predetermined activation threshold is exceeded if the ratio of the activation count to the total number of processed objects is above the predetermined activation threshold.

7. The method according to claim 5, further comprising:
   incrementing a deactivation count if the second fill is not compatible with the first fill; and
   if the deactivation count exceeds a predetermined deactivation threshold, deactivating at least the second fill.

8. The method according to claim 7, wherein the predetermined deactivation threshold is exceeded if the ratio of the deactivation count to the activation count is above the predetermined deactivation threshold.

9. The method according to claim 1, wherein the second fill is compatible with the first fill if the second fill and the first fill are defined in the same colour space.

10. The method according to claim 1, wherein the second fill is compatible with the first fill if the second fill and the first fill have the same bit depth.

11. The method according to claim 1, wherein the size of the bounding region is based on a number of objects within an associated area on a page.

12. The method according to claim 1, wherein the complexity measure of the first fill is determined based on a plurality of colours and a type of operators associated with the first fill.

13. A method of rendering a plurality of objects, the method comprising:
   receiving a display list representation comprising a first display list object associated with a first fill and a first path, and a second display list object associated with a second fill and a second path;
   determining a bounding region of the shared fill based on the first fill, wherein a size of the bounding region is affected by a complexity measure of at least one of the first object and the first fill;
   associating the first display list object with a shared fill by setting the first fill of the first display list object to the shared fill;
   updating the shared fill using the second fill in response to determining if the second fill is compatible with the first fill and the second fill is: (a) within a predetermined distance of the first fill, and (b) non-overlapping with the first fill;
   associating the second display list object with the updated shared fill, the updated shared fill being shared, in the display list representation, by the first display list object and the second display list object; and
   rendering the first object and the second object using the first path and the second path associated with the updated shared fill.

14. A system for rendering a plurality of objects, the system comprising:
   a memory for storing data and a computer program;
   a processor for executing said computer program, said computer program comprising instructions for:
      receiving a display list representation comprising a first display list object associated with a first fill and a first path, and a second display list object associated with a second fill and a second path;
      determining a bounding region of a shared fill based on the first fill, wherein a size of the bounding region is affected by a complexity measure of at least one of the first object and the first fill;
      associating the first display list object with the shared fill by setting the first fill of the first display list object to the shared fill;
      updating the shared fill using the second fill in response to determining if the second fill is compatible with the first fill and the second fill is: (a) contained within the bounding region, and (b) non-overlapping with the first fill;
      associating the second display list object with the updated shared fill, the updated shared fill being shared, in the display list representation, by the first display list object and the second display list object, and
   a printer receiving the updated shared fill to render the first and the second objects using the first path and the second path associated with the updated shared fill.

15. A system for rendering a plurality of objects, the system comprising:
   a memory for storing data and a computer program;
   a processor for executing said computer program, said computer program comprising instructions for:
      receiving a display list representation comprising a first display list object associated with a first fill and a first path, and a second display list object associated with a second fill and a second path;
      determining a bounding region of the shared fill based on the first fill, wherein a size of the bounding region is affected by a complexity measure of at least one of the first object and the first fill;
      associating the first display list object with a shared fill by setting the first fill of the first display list object to the shared fill;
      updating the shared fill using the second fill in response to determining if the second fill is compatible with the first fill and the second fill is: (a) within a predetermined distance of the first fill, and (b) non-overlapping with the first fill;
      associating the display list object with the updated shared fill, said updated shared fill being shared, in the display list representation, by the first display list object and the second display list object, and
   a printer receiving the updated shared fill to render the first and the second objects using the first path and the second path associated with the updated shared fill.

16. A computer readable non-transitory storage medium having recorded therein a computer program for rendering a plurality of objects, the computer program having instructions that, when executed by a processor, cause the processor to perform operations comprising:
   determining a bounding region of the shared fill based on the first fill, wherein a size of the bounding region is affected by a complexity measure of at least one of the first object and the first fill;
   associating the first display list object with a shared fill by setting the first fill of the first display list object to the shared fill;
   updating the shared fill using the second fill in response to determining if the second fill is compatible with the first fill and the second fill is: (a) contained within the bounding region, and (b) non-overlapping with the fill;
   associating the second display list object with the updated shared fill, the updated shared fill being shared, in the display list representation, by the first display list object and the second display list object; and
   rendering the first object and the second object using the first path and the second path associated with the updated shared fill.

17. A computer readable non-transitory storage medium having recorded therein a computer program for associating a shared fill with a plurality of objects, each of said objects being associated with a fill, said computer program having instructions that, when executed by a processor, cause the processor to perform operations comprising:
   receiving a display list representation comprising a first display list object associated with a first fill and a first path, and a second display list object associated with a second fill and a second path;
   determining a bounding region of the shared fill based on the first fill, wherein a size of the bounding region is affected by a complexity measure of at least one of the first object and the first fill;
   associating the first display list object with the shared fill by setting fill property of the first display list object to the shared fill;
   updating the shared fill using the second fill in response to determining if the second fill is compatible with the first fill and the second fill is: (a) within a predetermined distance of the first fill, and (b) non-overlapping with the first fill;
   associating the second display list object with the updated shared fill, said updated shared fill being shared, in the display list representation, by the first display list object and the second display list object; and rendering the first object and the second object using the first path and the second path associated with the updated shared fill.

18. A method for rendering a plurality of objects, the method comprising:

receiving a display list representation comprising a first display list object associated with a first fill and a first path, and a second display list object associated with a second fill and a second path;

determining a bounding region of a shared fill based on the first fill;

associating the first display list object with the shared fill by setting the first fill of the first display list object to the shared fill;

in response to determining if the second fill is compatible with the first fill and the second fill is: (a) contained within the bounding region, and (b) non-overlapping with the first fill, updating the shared fill using the second fill to reduce memory usage by the display list representation;

associating the second display list object with the updated shared fill to reduce memory usage by the display list representation, the updated shared fill being shared by the first display list object and the second display list object; and rendering the first object and the second object using the first path and the second path associated with the updated shared fill.

* * * * *